(12) United States Patent
Saklikar et al.

(10) Patent No.: US 9,059,986 B2
(45) Date of Patent: Jun. 16, 2015

(54) METHOD AND APPARATUS TO FACILITATE USING A FEDERATION-BASED BENEFIT TO FACILITATE COMMUNICATIONS MOBILITY

(75) Inventors: Samir Dilipkumar Saklikar, Mumbai (IN); Subir Saha, Bangalore (IN); John C. Strassner, North Barrington, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1542 days.

(21) Appl. No.: 12/593,351

(22) PCT Filed: Mar. 31, 2008

(86) PCT No.: PCT/US2008/058884
§ 371 (c)(1),
(2), (4) Date: Sep. 23, 2010

(87) PCT Pub. No.: WO2008/124365
PCT Pub. Date: Oct. 16, 2008

(65) Prior Publication Data
US 2011/0103265 A1  May 5, 2011

(30) Foreign Application Priority Data
Apr. 4, 2007 (IN) .............................. 770/DEL/2007

(51) Int. Cl.
*H04L 12/16* (2006.01)
*H04L 29/06* (2006.01)

(52) U.S. Cl.
CPC ......... *H04L 63/0815* (2013.01); *H04L 65/1069* (2013.01)

(58) Field of Classification Search
CPC . H04L 63/0815; H04L 63/1069; H04L 12/16; H04L 29/06; H04L 29/08; H04L 29/09; H04L 41/5054; H04L 12/28; H04L 67/08; H04M 11/00; G06F 21/00
USPC .............. 370/229–231, 235–236, 398–395.2, 370/350; 726/4–5, 7–8, 18–19; 445/432, 445/461; 455/432, 461, 445
See application file for complete search history.

(56) References Cited

U.S. PATENT DOCUMENTS

| 6,990,513 B2 | 1/2006 | Belfiore et al. |
| 6,999,769 B1 * | 2/2006 | Henon .......................... 455/445 |

(Continued)

FOREIGN PATENT DOCUMENTS

WO  2006000624 A1  1/2006

OTHER PUBLICATIONS

Rosenberg, J. et al., "SIP: Session Initiation Protocol," RFC 3261, pp. 270, Jun. 2002.

(Continued)

*Primary Examiner* — Charles C Jiang
*Assistant Examiner* — Mohamed Kamara
(74) *Attorney, Agent, or Firm* — Steven A. May

(57) ABSTRACT

While facilitating (101) a call session for a participating entity having at least one federation-based benefit, one then uses (102) that at least one federation-based benefit to facilitate communications mobility for the participating entity during the call session. Such a call session can comprise, for example and at least in part, a wireless call session. The federation-based benefit itself can be one provided by a content provider, a services provider, or the like.

18 Claims, 27 Drawing Sheets

(56) References Cited

U.S. PATENT DOCUMENTS

| | | | |
|---|---|---|---|
| 2002/0010771 A1* | 1/2002 | Mandato | 709/223 |
| 2003/0149781 A1 | 8/2003 | Yared et al. | |
| 2003/0229900 A1* | 12/2003 | Reisman | 725/87 |
| 2004/0148332 A1 | 7/2004 | Parolkar et al. | |
| 2005/0286422 A1 | 12/2005 | Funato | |
| 2006/0021019 A1* | 1/2006 | Hinton et al. | 726/10 |
| 2006/0129816 A1 | 6/2006 | Hinton | |
| 2007/0072605 A1* | 3/2007 | Poczo | 455/432.2 |
| 2007/0209065 A1* | 9/2007 | Branam et al. | 726/5 |
| 2008/0021997 A1* | 1/2008 | Hinton | 709/225 |

OTHER PUBLICATIONS

Handley, M. et al., "SDP: Session Description Protocol," RFC 2327, pp. 40, Apr. 1998.

Rosenberg, J. et al., "An Offer/Answer Model with the Session Description Protocol (SDP)," RFC 3264, pp. 24, Jun. 2002.

International Preliminary Report on Patentability and Written Opinion for counterpart International Patent Application No. PCT/US2008/058884 mailed on Oct. 15, 2009.

International Search Report and Written Opinion for International Patent Application No. PCT/US2008/058886 mailed on Jul. 29, 2008.

International Preliminary Report on Patentability and Written Opinion for related counterpart International Patent Application No. PCT/US2008/058886 mailed on Oct. 15, 2009.

Banerjee, et al., "Analysis of SIP-Based Mobility Management in 4G Wireless Networks," Networks' 2004 Computer Communications 27, 2004, pp. 697-707.

Choong Hee Han, "PCT International Search Report and Written Opinion," WIPO, ISA/KR, Korean Intellectual Property Office, Daejeon, Republic of Korea, Jul. 29, 2008.

European Search Report for corresponding European Application No. 08744763.7 mailed on Jul. 15, 2013.

* cited by examiner

700

*2000*

METHOD AND APPARATUS TO FACILITATE USING A FEDERATION-BASED BENEFIT TO FACILITATE COMMUNICATIONS MOBILITY

RELATED APPLICATIONS

This invention relates generally to:

method and apparatus to facilitate extending federation-based benefits to a called entity as was filed on even date herewith and which bears docket number CML05225N, India Patent Application No. 768/DEL/2007, filed on Apr. 4, 2007 (now abandoned) pursuant to U.S. foreign filing license serial number P-113,264, and which application has not been filed in the U.S.; and method and apparatus to facilitate extending federation-based benefits to a called entity as was filed on even date herewith and which bears docket number CML05226N, India Patent Application No. 769/DEL/2007, filed on Apr. 4, 2007 (now abandoned) pursuant to U.S. foreign filing license serial number P-113,358, and which application has not been filed in the U.S.;

the contents of which are fully incorporated herein by this reference.

TECHNICAL FIELD

This invention relates generally to network-based communications and more particularly to federation-based communications.

BACKGROUND

Networked-based communications of various kinds are known in the art and include, as one particularly well-known example, Internet-based communications. By such means a given call entity can contact one or more called entities and provide, receive, or exchange corresponding information and/or services. Existing facilities in this regard are highly flexible and have been leveraged in various ways to permit an almost limitless variety of call sessions to be established and supported as needed (where the expression call sessions will be understood to refer to all manner of communications exchanges including, but not limited to, voice-only and/or audio-only exchanges, still-image and/or video-only exchanges, audio-visual exchanges, and any of a wide variety of so-called multi-media sessions, to note but a few relevant examples in this regard).

In many cases, the entities engaged in such communications must establish some level of relationship with one or more other network entities in order to facilitate the call session itself and/or the availability of desired content and/or services. As one simple but relatively ubiquitous example in this regard, a calling party may need to first log-in with a given service provider before a call session will be honored and/or a request for particular content met. Such practices are often viewed as important or critical to ensuring the economic or proprietary integrity of such practices and approaches. Unfortunately, in some application settings, a repeated and/or intrusive need to attend to such exchanges can interrupt the user's experience with detrimental effects.

As one attempt to meet such concerns while nevertheless continuing to support the underlying rationale and approach described above, federated identities have been proposed. Such federation can comprise, for example, the virtual union of a network entity's user information that is stored, for example, across multiple distinct identity management systems. Such data can be joined together by, for example, the use of a pre-agreed set of attributes that singly or multiply unambiguously identify the entity in question used by multiple distinct identity management systems. Examples of such attributes include a user name, a pseudonym, and a temporary or permanent platform identifier. Such federation can also comprise, for example, the process of extending a user's authenticated identity and/or status with at least one trusted entity across multiple network entities, information technology systems, enterprises, and/or domains. The so-called Single Sign-On (SSO) effort, such as that supported in Liberty Alliance, is one example of how federation can be used. Note that such efforts usually require specific protocol support, such as the protocols defined by the Liberty Alliance to support their version of SSO.

By such an approach, a given network entity may, for example, gain transparent access to one or more benefits from a given content or service provider based upon the latter's reliance and/or use of information regarding that network entity via the use of such federation. Though constituting a clear improvement over past unfederated practices, present teachings in this regard are not, unfortunately, sufficiently comprehensive. Serious questions and issues remain regarding how to implement such federation-based benefits to better provide for a suitably scalable, efficient, cost effective, and leveragable approach.

BRIEF DESCRIPTION OF THE DRAWINGS

The above needs are at least partially met through provision of the method and apparatus to facilitate using a federation-based benefit to facilitate communications mobility described in the following detailed description, particularly when studied in conjunction with the drawings, wherein.

Figure 1:
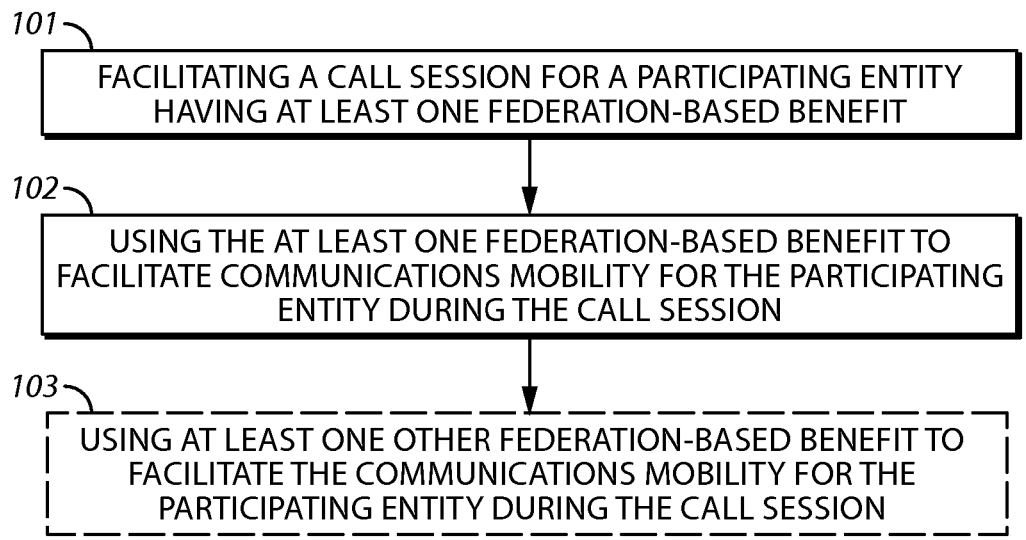
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, while facilitating a call session for a participating entity having at least one federation-based benefit, one then uses that at least one federation-based benefit to facilitate communications mobility for the participating entity during the call session. Such a call session can comprise, for example and at least in part, a wireless call session. The federation-based benefit itself can be one provided by a content provider, a services provider, or the like.

These teachings are applicable with respect to a variety of mobility scenarios. By one approach, for example, this can comprise moving at least a portion of the call session from a first user device to a second user device during the call session itself. As another example, this can comprise moving a first portion (such as, but not limited to, an audio portion) of the call session from the first user device to a second user device while also moving a second portion (such as, but not limited to, a video portion) of the call session from the first user device to a third user device. As yet another example, this can comprise moving at least a portion of the call session from use of a first identifier for the participating entity to a second identifier for that same participating entity. Those skilled in the art will recognize and appreciate that numerous other examples are possible as well.

By one approach, such use of a federation-based benefit to facilitate communications mobility can comprise use of an application-layer control protocol (such as, but not limited to, Session Initiation Protocol and/or Session Description Protocol). Such use can comprise indirect or direct usage of such a protocol as desired.

Those skilled in the art will recognize and understand that these teachings are highly leveragable as well as readily scalable to accommodate essentially any number of participating entities, mobility opportunities, and/or federation-based benefits. As one example in this regard, these teachings will readily accommodate using more than one federation-based benefit to facilitate such communications mobility during a given call session. As another example of the flexibility of these teachings, the federation-based benefits can be based, at least in part, upon identity credentials that correspond to the participating entity and, in such a case, the aforementioned use of the federation-based benefit to facilitate communications mobility can comprise, at least in part, using such identity credentials.

These and other benefits may become more clear upon making a thorough review and study of the following detailed description. Referring now to the figures, and in particular to FIG. 1, an illustrative process 100 that generally comports with these teachings provides for facilitating 101 a call session for a participating entity having at least one federation-based benefit. This call session can essentially comprise any known call session and can include, for example, an audio-only session, a video (or other graphic content)-only session, an audio-visual session, a data session, a multi-media session of whatever type, and so forth. Those skilled in the art will also recognize and understand that such a call session can comprise, at least in part, a wireless call session. As various such call sessions are known in the art, and as these teachings are not overly sensitive to the selection of any particular choice in these regards, for the sake of brevity further elaboration regarding such call sessions will not be set forth here.

The aforementioned federation-based benefit can also comprise any of a wide variety of known federation-based benefits. In addition, these teachings will also likely prove compatible for use with federation-based benefits as may be developed in the future. By one approach this federation-based benefit can comprise a benefit that is provided, in whole or in part, by a content provider. By another approach, in combination with or in lieu of the foregoing, the federation-based benefit can comprise a benefit that is provided, in whole or in part, by a services provider. Those skilled in art will recognize and understand that these references to a content provider and a services provider are intended to apply to a wide variety of corresponding providers.

As noted, this step provides for facilitating 101 a call session for a participating entity having at least one federation-based benefit. Accordingly, it will also be understood that this may comprise facilitating 101 a call session for a participating entity having two or more federation-based benefits. In such a case, the plurality of federation-based benefits can be provided by a single source (such as a single content provider or a single services provider (where a services provider can comprise any of a wide variety of services provider including but not limited to an identity services provider, a presence services provider, and so forth)) or can be provided by different sources as may correspond to the needs and/or opportunities that characterize a given application setting. As one simple illustrative example in this regard, a first such federation-based benefit may comprise a federation-based right to receive a particular item of content while another such federation-based benefit may comprise a federation-based right to receive access to and use of a particular playback and content rendering platform. Those skilled in the art will recognize and understand that this example is intended to serve only in an illustrative capacity and is not intended to comprise an exhaustive listing of all possibilities in this regard.

This process 100 then provides for using 102 the at least one federation-based benefit to facilitate communications mobility for the participating entity during the call session. This comprises a highly leveragable concept and finds application in any number of application settings. As one simple example in this regard, this step can comprise using the federation-based benefit to facilitate moving at least a portion of the call session from a first user device to a second user device during the call session (presuming that the first and second user devices are different from one another). To illustrate, a call session that begins at a first user device, such as a portable cellular telephone, may have a remaining portion thereof transferred to another user device such as a desktop computer having audio and visual content rendering capability where access to and/or use of the latter is achieved through reliance upon a corresponding federation-based benefit.

As another illustrative example somewhat along the same lines, this step can also readily accommodate using multiple federation-based benefits to facilitate moving at least a first portion (such as, for example, an audio portion) of the call session from the first user device (such as a cellular telephone) of the call session to a second user device (such as a high fidelity playback platform) and at least a second portion (such as, for example, a video portion) of the call session from the first user device to a third user device (such as, for example, a high definition video playback platform) during the call session where access to such playback platforms (and/or the communication channel(s) by which the relevant content is streamed to such platforms) is facilitated through use of and reliance upon the aforementioned multiple federation-based benefits.

As yet another illustrative example, this step can comprise using the federation-based benefit to move at least a portion of the call session from use of a first identifier for the participating entity (such as, for example, a cellular telephone number) to a different second identifier for the participating entity (such as, for example, a uniform resource locator address) where access to the latter proceeds in reliance upon the federation-based benefit. This step can also comprise, in combination with or in lieu of the foregoing, moving the corresponding portion of the call session from a first administrative domain (such as, for example, a public domain such as @yahoo.com) to a different, second administrative domain (such as, for example, a private enterprise domain such as @privateenterprise.com).

As noted above, federations can assume somewhat different forms and guises. Those skilled in the art will recognize and understand that these teachings are suitable for use with any and all such variations. As a specific though non-limiting example in this regard, these teachings are readily applied in combination with federation-based benefits that are based, at least in part, upon identity credentials that correspond to the participating entity. In such a case, then, the step of using the federation-based benefit to facilitate communications mobility for the participating entity during the call session can comprise, at least in part, using such identity credentials to effect such a result.

By one approach, this step of using federation-based benefits to achieve such functionality and results can be directly or indirectly effected through use of an application-layer control protocol (which itself typically comprises a protocol, such as Session Initiation Protocol (SIP) or Session Description Protocol (SDP) that is configured and arranged to create, modify, and terminate communication sessions that feature at least one participant).

As noted above, the participating entity may have more than one such federation-based benefit that can serve in such a manner. In such a case and where appropriate or desired, this process 100 will optionally further provide for using 103 such additional federation-based benefits to facilitate such communications mobility. This can comprise use of plural federation-based benefits to effect a particular given instance of communications mobility or can comprise seriatim application of such benefits to effect a plurality of discrete mobility events.

Figure 2:
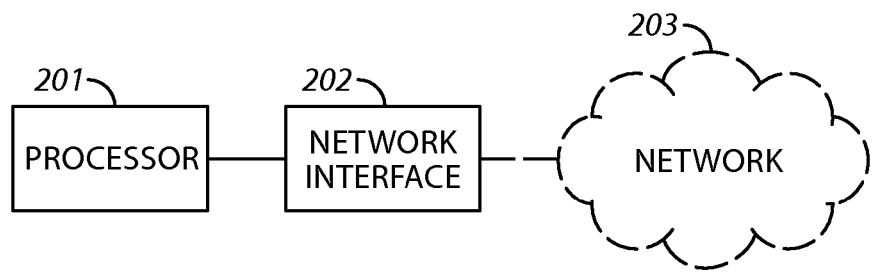
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

In this illustrative embodiment, a corresponding apparatus 200 comprises a processor 201 that operably couples to a network interface 202. The latter can couple, in turn, to one or more networks 203 of choice (such as one or more wired and/or wireless intranets or extranets (such as the Internet). So configured, the processor 201 can be configured and arranged (via, for example, corresponding programming as will be well understood by those in the art) to carry out one of more of the steps and actions set forth herein. This, in turn, permits this apparatus 200 to use one or more federation-based benefits as relate and/or belong to a participating entity in a call session to facilitate communications mobility for that participating entity during that call session as described herein.

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as is known in the art.

Some more specific examples that generally pertain to these teachings may be of help to the reader. For the sake of illustration and not by way of limitation, many of these examples refer to Voice over Internet Protocol (VoIP). Those skilled in the art will recognize and understand that these teachings are not limited to only this particular sphere of activity.

Figure 3:
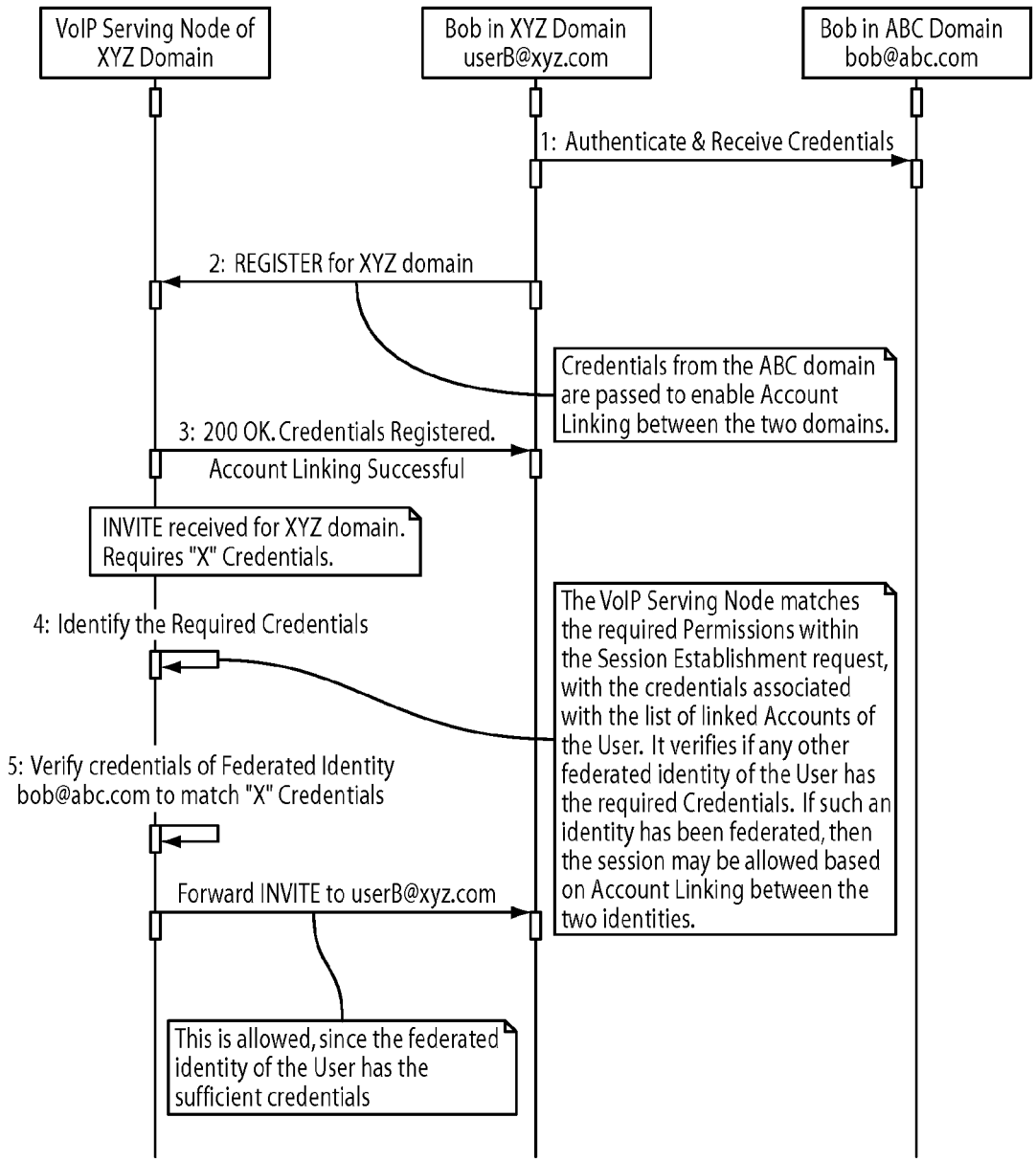
FIG. 3 comprises a call flow diagram as configured in accordance with various embodiments of the invention.

Referring now generally to FIG. 3, an illustrative call flow diagram 300 describes one approach to providing federation-based benefits for a called party. Herein, the called party federates at a preliminary time of registration and links its different identities spread over different serving nodes with the specific VoIP Serving Node in question. While federating each identity, the corresponding sets of credentials are also registered. In this example the VoIP Serving Node receives sufficient permissions to be able to choose a most appropriate identity for this party upon receiving a Session Establishment Request.

Thereafter, a Session Establishment Request received for one identity of the called party will reach the VoIP Serving Node, which is serving that identity. Should that identity does not have sufficient credentials for the session to be successfully setup, however, the VoIP Serving Node may then use the account linking feature of identity federation and verify if another federated identity of the called party has the required credentials. If such an identity with the requisite credentials has been previously federated, then the call can still be forwarded to the originally intended identity based on an account linking aspect between the two identities. So configured, the session is established with the originally-intended identity of the called party notwithstanding that this originally-intended identity otherwise lacks the required credentials.

Those skilled in the art will appreciate that such account linking via the Serving Node would help in ensuring that whatever identity of the called entity is being reached in the current session establishment request, the called party will receive an enhanced benefit by virtue of the described prior federation done by the called party.

Figure 4:
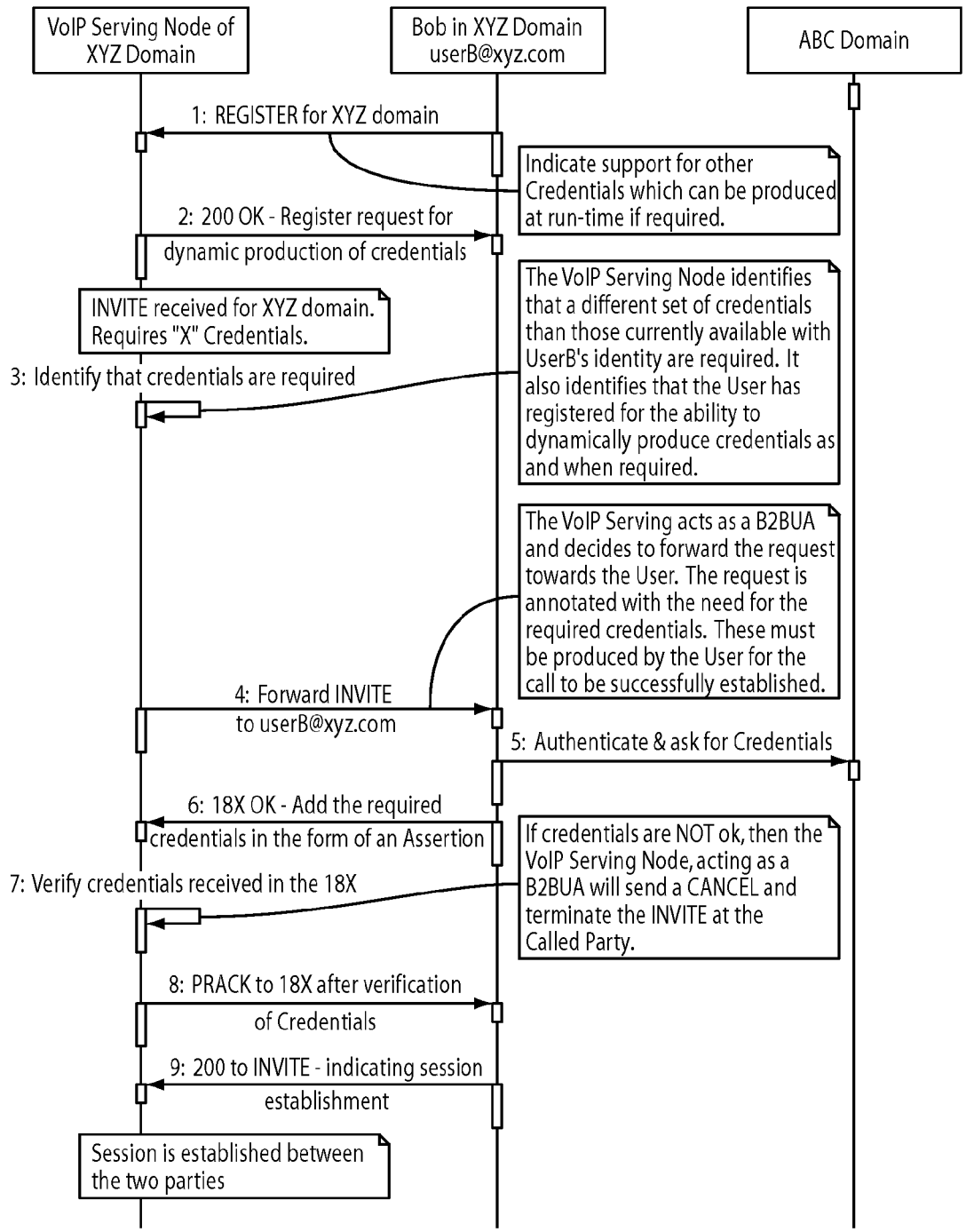
FIG. 4 comprises a call flow diagram as configured in accordance with various embodiments of the invention.

With reference now to FIG. 4, an illustrative call flow diagram 400 describes one approach to providing dynamic accounting linking as controlled by the called party. In this example, the called party has a set of identities that are not federated or otherwise exposed to the VoIP Serving Node. Instead, the called party itself maintains a corresponding list of identities along with their respective corresponding credentials. When this party then registers with the VoIP Serving Node, it can indicate the availability of another set of identities having differing credentials and that the called party prefers to have final control with respect to choosing a particular identity (and the corresponding credentials).

When a VoIP Serving Node receives a Session Establishment Request that requires particular credentials that are currently not available with the registered identity of such a called party, it can assure itself that the called party can produce the required credentials before allowing the session establishment. By this approach, the VoIP Serving Node effectively acts as a Back-to-Back User Agent (B2BUA) and sends an INVITE towards the called party. By one approach, this INVITE can be marked with the appropriate credential requirements that must be satisfied before the call can be successfully established.

The called party can receive this INVITE and understand the credential requirements. In this approach the called party has control with respect to deciding whether to accept the session by producing the required credentials. When the called party is not interested in establishing the session it may refuse to produce the required credentials. When this occurs the Serving Node will reject the call due to insufficient authorization on the called party side.

When the called party does want the session to continue, then it must produce the required credentials (for example, by doing back-end federation with another identity provider who can assert those credentials for this party). This other identity provider may provide the credentials for the same identity of the called party as were involved in the call session, or a different identity of the called party. For example, a user having received a call session on their personal identity (for example, "user@home.com") may choose to receive and use the credentials as are associated to their professional identity (for example, "user@office.com"). By another approach, the called party can ask/query for the required credentials from a different entity that is willing to lend usage of their credentials to the called party for the purpose of establishing a call session. For example, a child (having, for example, having the identity "son@home.com"), having received a request for session establishment, may choose to borrow the required credentials from his father (as might be associated, for example, with "dad@home.com") for the purposes of establishing the call request. Once this back-end federation is successful and the credentials have been received, the credentials can be returned in an 18X reliable provisional response to the VoIP Serving Node.

The VoIP Serving Node verifies the credentials in the reliable provisional response. When the credentials are found suitable the VoIP Serving Node sends a PRACK (Reliable Provisional Response Acknowledgement) indicating that the session can be progressed. The called party then responds with a 200 response and the session can be established. When the called party does not produce sufficient credentials, the VoIP serving node can send a CANCEL to the INVITE. In the alternative, if the called party sends a 200 message without sending the appropriate credentials then the VoIP serving Node will send a BYE and terminate the call since the sufficient credentials were not produced.

Figure 31:
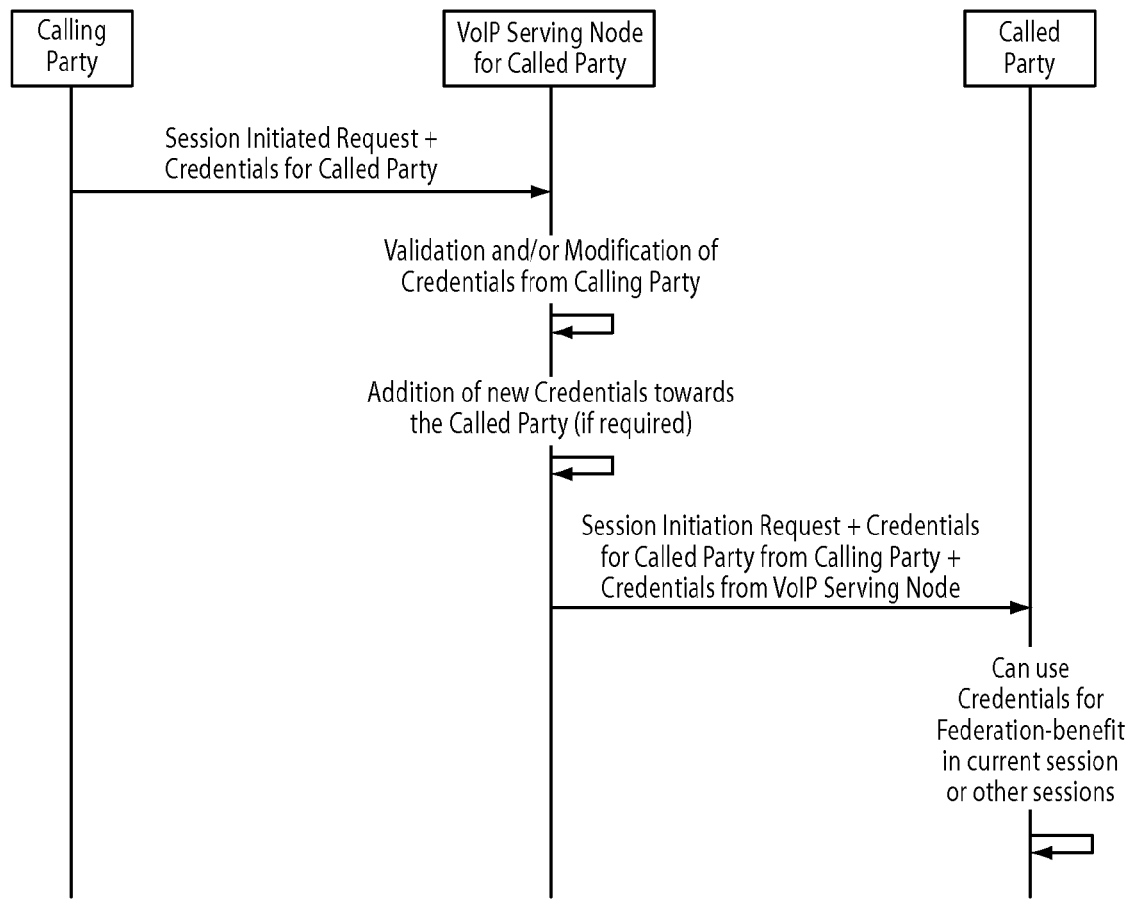
FIG. 31 comprises a call flow diagram as configured in accordance with various embodiments of the invention.

Referring now generally and momentarily to FIG. 31, an illustrative call flow diagram 3100 describes another approach to providing federation-based benefits to a called party. Herein, the calling party at the time of initiating the call session towards the called party attaches a set of credentials for delivery towards the called party. This delivery of credentials towards the called party can be validated by the VoIP Serving Node for the called party. In this illustrative example the Serving Node also has the freedom to modify, add, and/or delete credentials as pertains to that which would be delivered towards the called party. The called party would receive the credentials along with the session initiation request. The called party further has the flexibility to use these credentials within the context of this session or in context of some other multi-media session. By another approach, the called party may use the credentials in one or more of a hypertext transfer protocol (HTTP) session and/or a Web-services session.

Some description will now be provided with respect to the different kinds of serving nodes to be found in a VoIP network, along with their functionalities. This description will also illustrate how identity federation principals can be applied to such entities and the benefits that may be expected in this regard.

Registration Nodes

Registration Nodes accept the registration requests for a single identity of the user as controlled by the domain of the Registration Node. These entities track which devices the user currently has available for that identity and provide this information to route incoming call-requests to the appropriate user devices. Currently, Registration Nodes do not consider or store any information about other identities of a user, across other domains. As a result, these entities are only able to provide services to this one user identity that is registered in the domain that corresponds to the Registration Node.

By mapping their role as defined by the SIP architecture, however, Registration Nodes are actually well placed to act as Identity Providers (Asserting Parties) for their respective domains. For example, Registration Nodes are the first entities within a network which a user device must contact and register. This registration process is authentication-based. Thus, this process can be further leveraged by having the Registration Nodes act as Asserting Parties and then asserting authentication, authorization, and attribute information about their users to other SIP nodes in the network to thereby provide SSO to the user.

In addition, Registration Nodes know about the various contacts which are registered by the user. Hence, they can further assert this identity information (viz. the registered devices) of the user towards other SIP Nodes. Further, Registration Nodes can play the role of a Relying Party. More particularly, a given Registration Node can accept assertions from other domains and then provide assertions within their own domain (even, if desired, as based on another level of authentication). Such a Registration Node can therefore act as bridging identity providers by allowing for account linking of various identities of the user across administrative domains. By asserting for identities within their own domain and also extending the trust on other Identity Providers within their own domain, Registration Nodes can aid in facilitating cross-domain identity federation.

Home Serving Nodes

Home Serving Nodes have the responsibility of accepting Session Establishment Requests for the called user and then appropriately directing such requests towards the configured devices of the user. Also, they help the calling user, when initiating a Session, by appropriately forwarding the Session Establishment Request to the Serving Node for the called party. These network entities are also in the transaction path and thus have knowledge about the capabilities of the user within that particular transaction. For example, by virtue of having set up a multi-media session, they know about the current status and capabilities of the user in terms of that particular session. These entities provide these services only for that user identity, however, which belongs to the domain for the Serving Node.

Since the Home Serving Nodes provide services to the user, they can be further leveraged to perform the role of Relaying Parties as defined in the Identity Federation Architecture. So purposed, they can accept credentials from different federated identities of the user and provide services as follows.

The Home Serving Node can provide services to the calling user by:

Acting as a Relying Party and accepting credentials from the Registration Node to provide a Single Sign On experience to the user without authenticating the user explicitly, at the time of initiating or terminating a session-related request.

Acting as a Relaying Party to accept credentials about various attributes or account linking aspects of the calling user, to provide further services to the calling user. (Thus, the user may invoke services using credentials for another identity in another domain and the Home Serving Node would provide services for the user in its domain.)

The Home Serving Node can also provide services to the called user by accepting incoming Session Establishment Requests for a given user and allowing the Session Establishment to continue even when the user's identity does not have required credentials when a federation link has been established with another identity in another domain which has the required credentials. The Session would be established with the originally intended identity of the called party only though the services could be based on the credentials as available to the federated identity of the user.

Further more, since the Serving Nodes provide services to the user (such as call establishment and the like), they are well aware of the current transactional status and capabilities of the user. Thus, they are also well placed to act as Asserting Parties about the current transaction(s) of the user.

As an example, consider a case where the Serving Node (having set up the session with a particular device) can assert the fact that the "user is in session using a certain device." Later, when the user moves to another device during the session, this assertion from the Serving Node stating that the user was in a session on a particular device can be accepted to allow the seamless transfer of the session to the new device.

Data Collating Nodes

Data Collating Nodes collate data on behalf of the user that can be shared with other users. For example, a Presence Server that tracks the presence and availability status of a user shares that information with other users based on user defined policy. In existing SIP networks, however, such data collation is done only for a single specific identity of a user and data collation and sharing across different identities of a user is not possible by a single Data Collating Node.

A Data Collating Node accepts user information only for a particular identity which it controls. Using Identity Federation, however, it would be possible for the user to provide information about another federated identity which the Data Collating Node would accept and collate with its local identity information.

Figure 5:
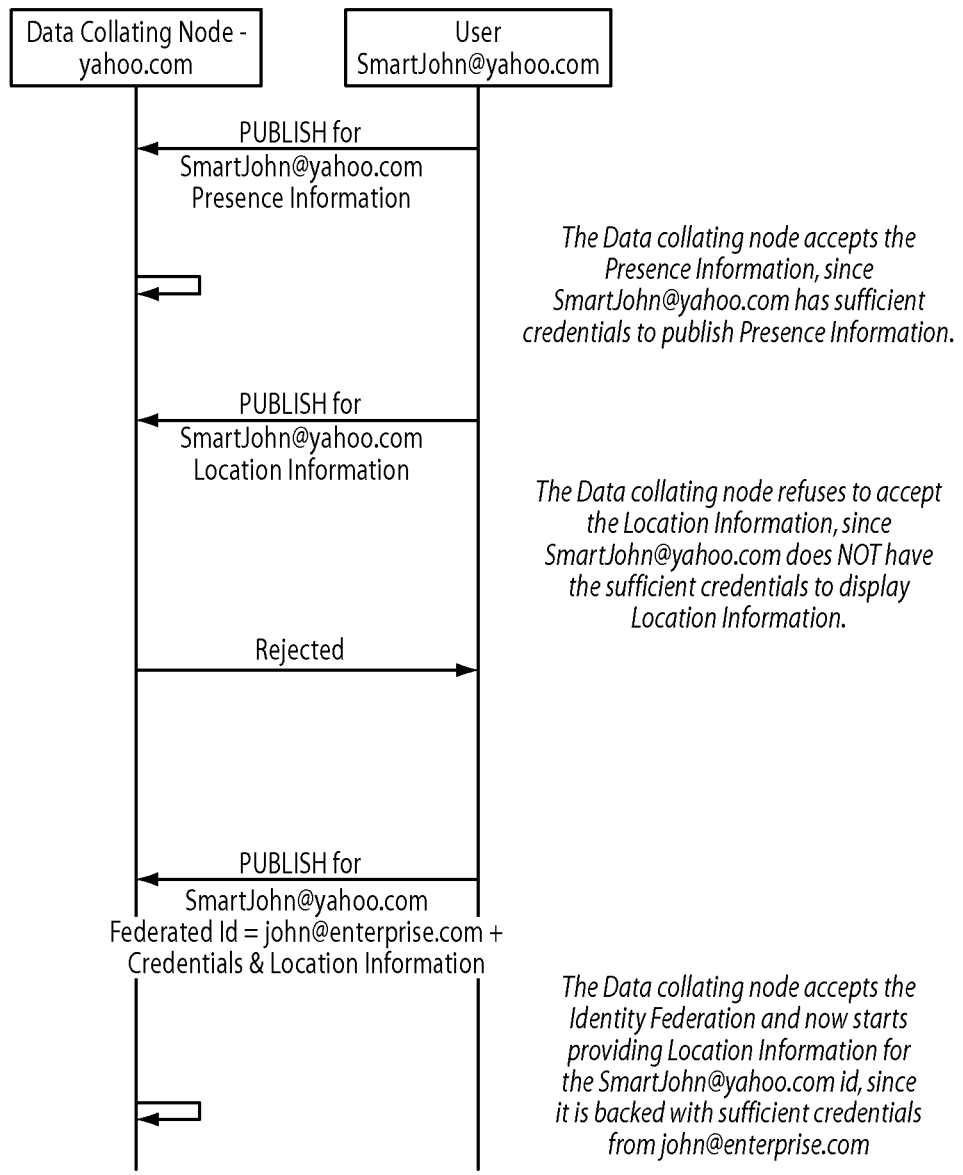
FIG. 5 comprises a call flow diagram as configured in accordance with various embodiments of the invention.

Referring generally now to FIG. 5, an illustrative process 500 in this regard assumes that a user has the identity user1@yahoo.com, for which the user has sufficient credentials (such as a Yahoo login and password) and the user may choose to show their presence information to other users through Yahoo. This identity does not have any credentials that authorize the user to display their location information along with their presence information. Even if Yahoo were to display the location information, as given by the user, it cannot typically trust the user directly and might well decline to take the legal responsibility of displaying user given location information. In this example, however, the user has another identity (for example, an enterprise identity) that has sufficient credentials to form the basis of displaying location information. Pursuant to the present teachings the user can federate both identities. Now, Yahoo can trust the credentials given by the user for her enterprise identity under these same circumstances and hence accept the location information and provide it along with the presence information.

There is another identity federation-related aspect towards Data Collating Nodes of potential interest. In particular, the identity of the users who are interested in information about other users. Typically, Data Collation Nodes display information about a user to other users based on their appropriate authorization to view the information. Hence, here too it is possible that identity federation can be employed so that a user who does not have sufficient credentials to view information about someone can nevertheless use a federated identity to obtain those required permissions.

Figure 6:
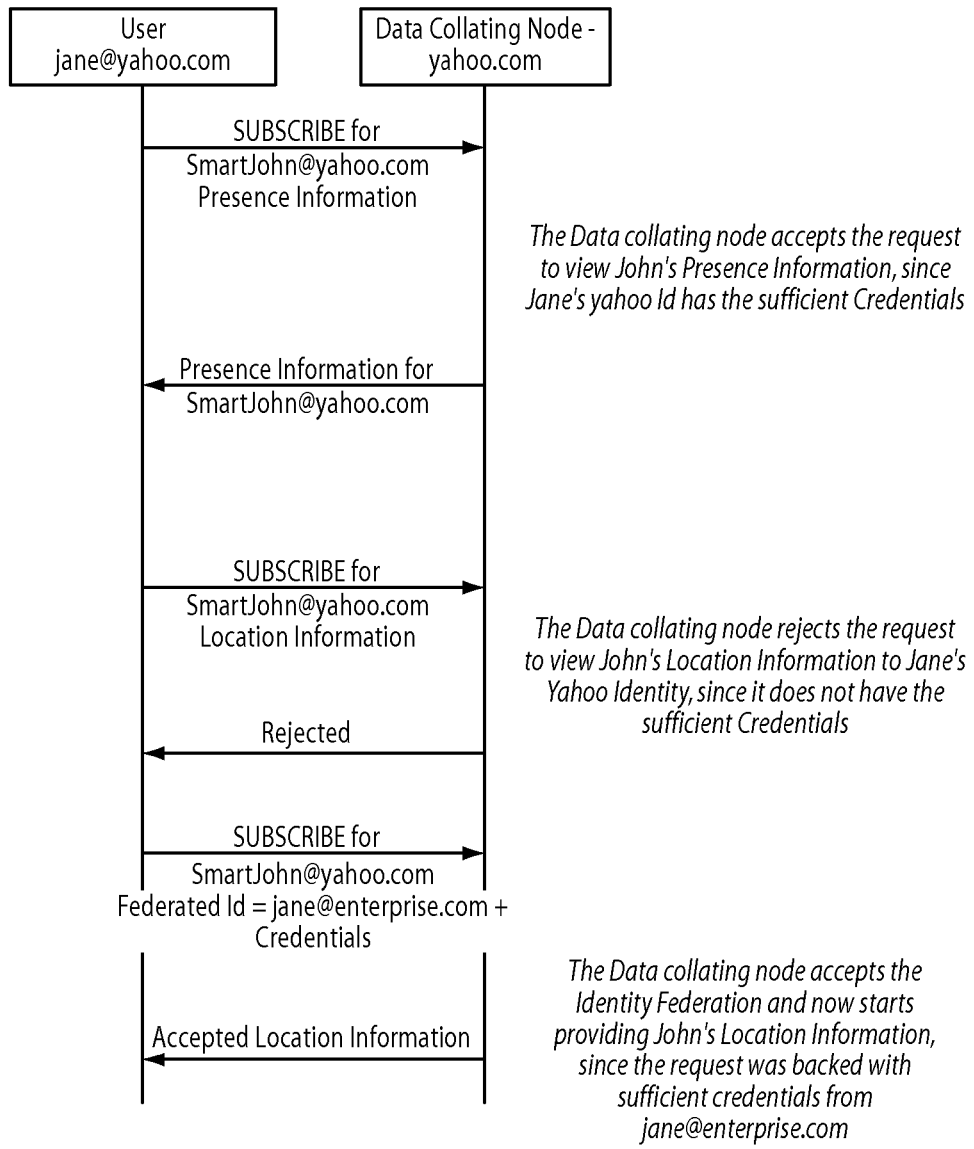
FIG. 6 comprises a call flow diagram as configured in accordance with various embodiments of the invention.

FIG. 6 presents an illustrative process 600 in this regard. In this example, a user Jane logs in into Yahoo (using, in this example, jane@yahoo.com) and can gain access to her co-workers presence information. In this example, however, the user does not have access to her co-workers' location information from her Yahoo Id. By applying these teachings, however, the user may federate her enterprise credentials with her Yahoo ID. With the help of those credentials she is then served her co-worker's location information to her Yahoo identity.

Applications Servers are also known in the art and typically provide a specific functionality to SIP entities. Such servers are typically introduced into the signaling path or the media path to act as Conferencing Servers, Media Servers, $3^{rd}$ Party call Controllers, or the like.

Such Application Servers provide services to users based on a specific identity. Typically, the authentication of the users is done by the network providing the SIP services for a corresponding Information Management System (IMS) network. By applying the present teachings, users could invoke such Application Servers with a federated identity to thereby provide sufficient credentials in the aggregate to invoke the desired service which might otherwise not be possible with their registered identity. Thus, users could have the choice to pull in essentially any Application Server, with which it has sufficient credentials, to provide a service to any of their other federated identities. As one illustration in this regard, it would be possible to invoke services from a $3^{rd}$ Party Application Server that is hosted outside the present IMS. Identity Federation would therefore provide a mechanism to allow the user to leverage their IMS identity with a non-IMS hosted Application Server. It is also possible that a group based identity (Such as an identity for a group of users) or attribute-based login concepts as used by individual users could serve to invoke services from such Application Servers.

Further elaboration will now be presented with respect to the premise on which identity federation can be established within Session Initiation Protocol. For every transaction that a SIP user initiates, the domain provides service only when the SIP user proves that it has sufficient rights to access the service. One of the mechanisms of proving this right is through authentication. Such authentication may be either based on a shared key or a secret key mechanism. However, this authentication forms the premise for the Service Provider to assure itself either of the identity of the user, the user's rights, or both. Pursuant to these teachings, such content may be federated outside of the domain to facilitate providing cross-domain services to the user.

It is possible that the premise of assuring a given domain that a given user has the right to obtain certain services may be established by means other than authentication. For example, the very fact that a user could invoke a service within a private network (such as an intranet) may be sufficient to assure the Service Provider that the user has access to the service. Hence, it may be said in a generic sense that once a user has been provided a Service, then she has proved that she has (or at least had) a right to use the service. Thus, this relationship between "has been provided service" and "had a right to use the service" can also form one of the means by which a claim of a user can be established and further federated.

Thus, a user may make a request to enable federation for a certain right, based on either of the above as when the user has previously authenticated or the Service Provider has established trust in the user by some other means. The user may make this request in those SIP message that are indicative of "authentication rights" (for example, successful registration indicates that the user was authenticated to register a contact for the AOR belonging to the domain). As another example, the user may make the request in those SIP messages that are indicative of "providing a service" (for example, successful session establishment indicates that the user was provided a service and thus had a right to the service).

Essentially all SIP messages and functionality can be fit into the above two paradigms of establishing a user's rights. Thus, a user can make a request to enable federation in all kinds of SIP messages and by the same principle make the request to all kinds of SIP nodes. Which SIP nodes choose to accept the request for enabling federation can be based on such factors as domain policies, node capabilities, and the like.

Figure 7:
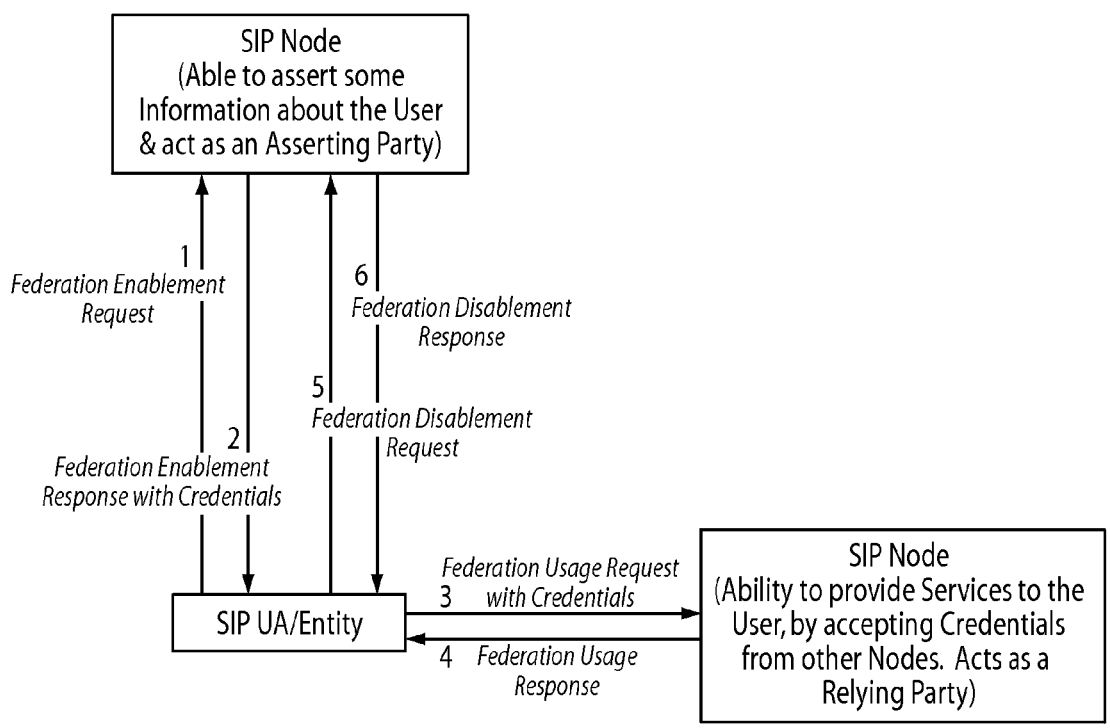
FIG. 7 comprises a block diagram-based call flow diagram as configured in accordance with various embodiments of the invention.

Identity federation within SIP can be explained within the context of Federation Enablement, Federation Usage, and Federation Disablement. Referring now generally to the illustrative schematic diagram 700 shown in FIG. 7, before it can avail of any Federation benefits, every SIP entity must typically enable identity federation at the node which it wants to act as the Asserting Party (that is, a node that will be asserting some identity information about the SIP entity). After such enablement, the SIP entity can use this federation at another SIP Node by using the credentials that were returned during the federation enablement process. In addition, when the SIP entity does not want the federation benefits to be available, the Federation can be disabled at the Asserting Node.

As noted earlier, these teachings can be facilitated, in whole or in part, through use of an application-layer control protocol. This can comprise, if desired, direct use of such functionality. To illustrate this point, examples will now be presented with respect to relatively modest additions that can be made to Session Initiation Protocol to specifically permit the use of federation-based benefits via such a protocol. Those skilled in the art will appreciate and recognize that the use of such an example is intended to serve only as an illustrative example and is not intended to serve as an exhaustive or otherwise limiting example in this regard.

Figure 8:
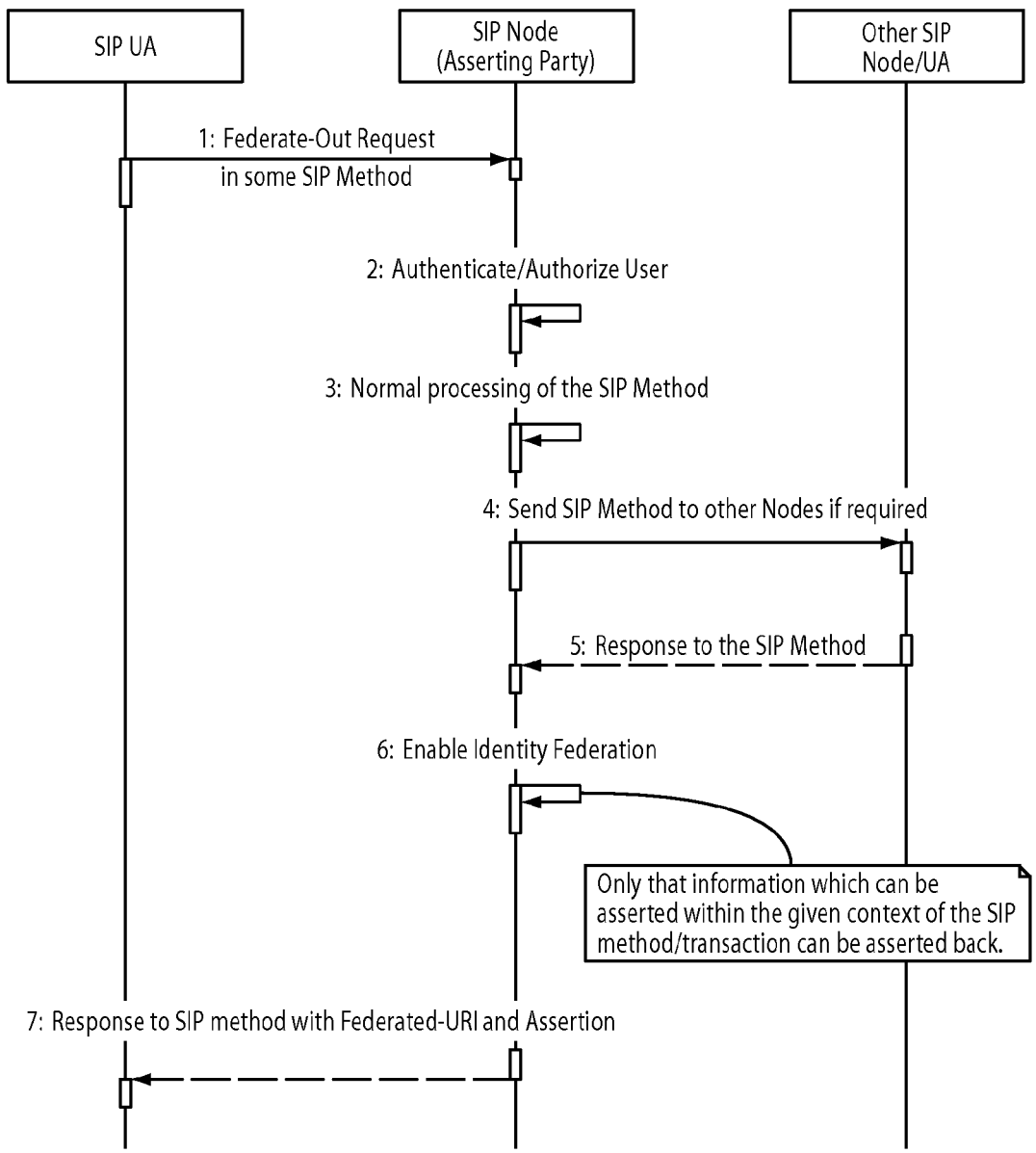
FIG. 8 comprises a call flow diagram as configured in accordance with various embodiments of the invention.

With reference to FIG. 8, identity federation can enabled in SIP by using the concept of "federating-out" some information. This can comprise, for example, a request from a SIP User Agent (UA) to a SIP node to make some information about the SIP UA available for federation. The usage of the term "out" indicates that federation information, as is available in the current SIP transaction/context, can be enabled and made available for federation to be used by other entities who can act as Relying Parties.

By one approach, this "Federate-out" request can be sent in any SIP method or Response that has some acknowledgement. Thus, it can be present in any SIP Request or the response to an INVITE for which the ACK is sent as the acknowledgement. This acknowledgement mechanism is useful so that the Asserting Party can send back the result of the "federate-out" request along with the corresponding credentials to the requesting UA. By another approach, this "Federate-out" request can also be sent in a SIP response that does not have any acknowledgement. In such a case, the Asserting Party may be required to send back the result of the "Federate-out" request in a SIP INFO method.

The amount of identity information which the Asserting Party can assert (that is, federate-out) may correspond to the authentication, authorization, and attribute information associated with the SIP UA within the invocation of that SIP Method/Response by the user at the SIP node. Thus, this information can and will vary depending on which SIP method is invoked and at which node. The following example(s) describe some exemplary SIP methods where the "Federate-Out" request can be used and the purpose it achieves.

REGISTER Method

As one example, by sending the "Federate-out" request within a REGISTER message, the Asserting Party (such as the Registrar) can assert information about the various contacts which the user is registering. The "Federated-out" information may include (but is not limited to) other information as is available in a REGISTER response, such as time of the registration, the authentication method used, and so forth.

INVITE Method

If the "Federate-out" request is sent within an INVITE, then the Asserting Party (such as the Home Proxy) can assert information related to the session that the user is setting up. For example, if the user was authenticated and is in a multimedia session, then the Proxy can assert this information (that is, the fact that the user is in a multi-media session). This assertion can be presented to some other entity, who may then provide services to the user (for example, to another proxy during the seamless transfer of that session from an Asserting Proxy to the Relying Proxy).

SUBSCRIBE Method

The SIP-UA may send the "federate-out" request within a SUBSCRIBE method. In this case the UA can get an assertion from the Asserting Party (such as the node handling the SUBSCRIBE method) post authentication indicating that the user has rights to subscribe to that information that was allowed in the SUBSCRIBE method. This assertion may be used in another context to get the same benefit of being able to subscribe to that kind of information. For example, the user may login to her enterprise Instant Message (IM) service from her laptop and subscribe to the state of her enterprise peers, managers, or the like. She can then receive an assertion from the enterprise about her subscription rights and present it further to her Yahoo instant message Server to see the status of her non-enterprise buddies on her mobile phone in an integrated IM client.

Those skilled in the art will recognize and appreciate that such a "federate-out" functionality can be sent using any essentially SIP method (or possibly any response as well) wherein it is possible to federate out the credentials for that particular transaction or identity.

The set of identity information (or user-identity itself) that is being federated out (that is, asserted) by the Asserting Party can be identified by a "federated-identity-URI" (where URI refers to Uniform Resource Identifier). It could be used by the SIP UA when seeking to use the federation at some other SIP Node (such as the Relying Party). This URI can be indicative of the set of identity information that is being federated-out from the Asserting Party. This information will typically be a sub-set of the overall user information or capability. Such enablement of enabling federation for only a sub-set of the user information helps in protecting the user privacy. If desired, this URI need not be the URI used in SIP for accessing the user/device (such as, for example, the AOR or the Contact URI). Instead, if desired, a federated-URI can be generated by the Asserting Party and applied towards the Relying Party using a pseudonym for the user.

The Federated-URI will typically be associated with an Assertion, such as that enabled by (but not limited to) the usage of the Security Assertion Markup Language (SAML). This Assertion in turn includes the information that the Asserting Party is willing to assert about the user. Typically this information will be of one or more of (but, not limited to) the following types:

Authentication Information—Indicating the times, means, and method by which the user was authenticated;

Authorization Information—Indicating the authorization rights of the user; and/or Attribute Information—Indicating the attributes associated with the user.

Once a user has federated out a certain right (via, for example, the federation-enablement request associated with a claim to a certain identity and/or rights), the user may take advantage of the federation by federating that identity within another context within the same or a different domain. The following illustrative benefits, amongst others, are rendered feasible and possible by this concept of federating an identity into a context:

Single-Sign-On (SSO)—A user may federate their identity with the other Serving Nodes in a given domain to obtain corresponding SSO benefits;

Attribute Based SSO—A user may federate out her enterprise identity's rights of accessing a conferencing service to another domain to permit using the conferencing facility from another identity;

Account Linking—A user may federate her enterprise identity allowing her to publish her location information with her Yahoo identity to thereby permit others to see her location within Yahoo.

Figure 9:
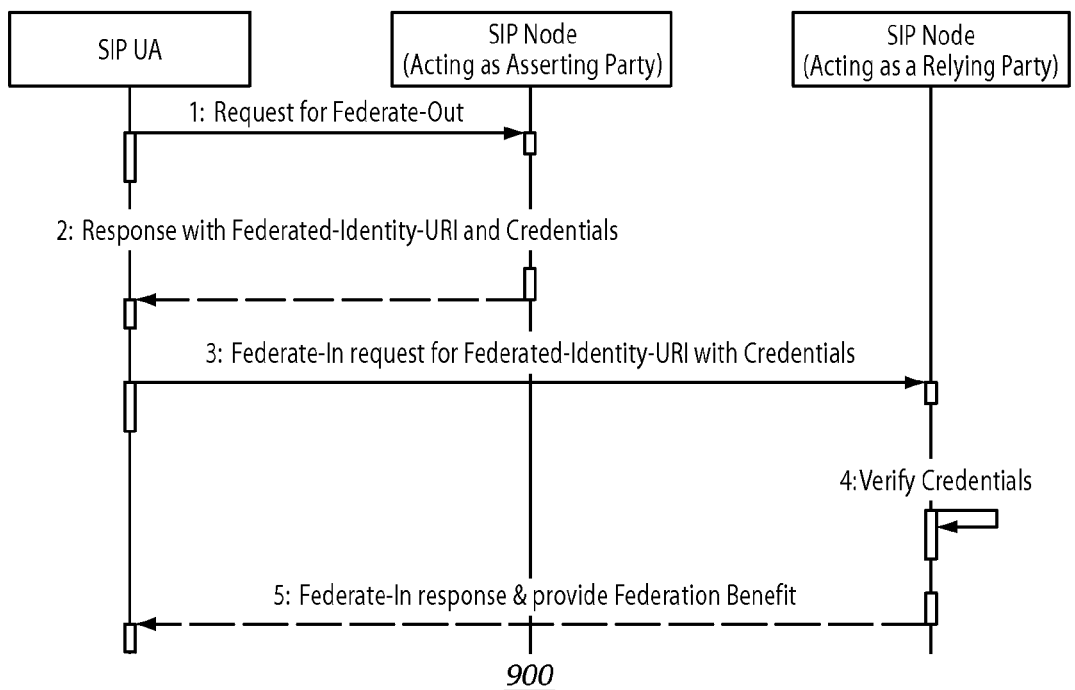
FIG. 9 comprises a call flow diagram as configured in accordance with various embodiments of the invention.

Referring generally now to FIG. 9, an illustrative call flow 900 as corresponds to identity federation for SIP networks provides a basis for allowing a user to enable federating-in an identity (along with associated credentials and information) into another context by including a Federate-In Request within that context (for example, while registering a device, establishing a session, or publishing any information to get federated benefits). This inclusion of a "Federate-in" Request in a SIP Message (Request or Response) from the user to the Serving Node in turn facilitates honoring the federated identity to get benefits. The Serving Node can then determine whether to choose to accept the federation usage request and to what extent. A Serving Node may, for example, choose to provide restricted federation benefits based on domain policy or other factors and criteria of choice.

Identity Federation can be used in SIP by federating "in" some identity information that was previously federated "out." Thus, post federation-enablement, the user or the SIP UA can send a "federate-in" request in another SIP message to use the previously federated identity and the associated rights along with this new SIP message. The federate-in request could contain the aforementioned "federated-identity-URI" and the Assertion that was returned as a result of the federate-out request.

The "federate-in" process will typically always be applicable to the current context of the user. Accordingly, the federation-based benefits are enabled for the current context/transaction as defined by the SIP message, which contains the federate-in request. Those skilled in the art will understand that a context in the scope of SIP may mean a transaction, a dialog, a subscription, a registration, or any other current process being set up between the user and the SIP node.

Thus, the "federate-in" functionality is configured and arranged in such a way that it can be used in essentially any SIP request or Response where the user wants to include and/or receive identity federation benefits. This flexibility to use a "federate-out" and "federate-in" headers in a user-chosen manner in almost all the SIP requests and/or responses introduces a highly flexible, leveragable, and scalable identity federation architecture for SIP that effectively allows for plugability of user credentials from one SIP administrative domain and/or context to another.

The examples provided above illustrate how a user may federate-out and federate-in an identity and its associated rights. These examples illustrate the processes separately by showing how some identity information that is "federated-out" at one domain can be "federated-in" to a context at another. These are two separate steps of using identity federation benefits and will likely ordinarily be done in that order (that is, federating-out some information prior to federating-in that information at some other place).

It is also possible, however, to use both such functionalities partially or wholly simultaneously. For example, this may reasonably occur when dealing with different identity information data. To illustrate, a user would be able to federate-out a first identity X by using federation benefits from a federated-in second identity Y. Thus, in such a case, the user is using both semantics together while dealing with different types or sets of identity information.

Such an approach may be useful, for example, when the user wants to extend a federation from one domain X to another domain Y while only limit exposure of the identity from X to the asserting party in the other domain Y but not to other relying parties in domain Y. In such a case, the user could "federate-in" the identity X from the other domain and ask the asserting party of the domain Y to "federate-out" some identity information for the domain Y with similar or equivalent rights. Such a bridge would also be useful at times when relying parties in a domain do not trust an asserting party in another domain. In such cases, these teachings will support the provision for a bridging entity that can act as a relying party for the other domain and assert the identity-information within its domain.

The above examples describe enabling federation by using a "federate-out" request in SIP processes like Registration, Session Establishment, Subscription, Publish, and the like. The life-time of the federation, however, need not necessarily be tied with the life-time of the context/transaction that was used to enable the federation (for example, the lifetime of the registration, duration of the corresponding session, and so forth). By one approach, the federation may last longer until it is explicitly disabled by the user, or times-out due to user or domain defined policy. A user may switch off a device (un-register) but still prefer that the Registrar be able to federate that identity to other domains for services until a certain point of time or until a certain event occurs. As yet another example, a user may not be in any session, but would still prefer the Serving Node to federate its identity to other domains.

By one approach, a user could explicitly disable federating out an identity by sending a federate-out header with parameter such as "disable" in the SIP messages to the SIP Node that is acting as the Asserting Party. A user may also disable federating out an identity by sending a request in a REGISTER message while un-registering a contact or registering a new contact. As yet another example, the user may disable federating out an identity in a BYE message while terminating an existing session or a new INVITE while establishing a new session. Similarly, the user may disable federating out an identity while un-subscribing or publishing some new information.

If desired, new headers can be added to SIP to support the concept of "federate-out" and "federate-in" as described above. Some illustrative examples in this regard might include, but are not limited to a federate-out header having the following protocol syntax:

Federate-Out="Federate-Out" HCOLON federated-identity-uri*(SEMI federated-identity-uri-params)
   federated-identity-uri=LAQUOT absoluteURI RAQOUT
   federated-identity-uri-params=enableDisableParam/pseudonymControlParam/samlMessageParam/propagateFederationParam/targetURI
   enableDisableParam="enable"/"disable"/"reject"
   pseudonymControlParam="pseudonym" EQUAL ("true"/"false")
   samlMessageParam=cid-url
   propagateFederationParam="propagate" EQUAL ("true"/"false")
   targetURI=LAQUOT absoluteURI RAQOUT Such a header can serve to indicate a request to the SIP node to enable or disable a federation for the user identity. In this case, this ability to enable or disable a federation is controlled by the value of the "enableDisableParam" parameter.

The "federate-out" header can be used for enabling a federation. Herein, the "enableDisableParam" parameter is filled in as "enable" by the Requesting UA. While enabling a federation, this header can be used for various purposes. As one illustration in this regard, in the "Federate-Out" request from the Requesting UA to the SIP Node (Asserting Party), the header can indicate a federation-enabling request from the Requesting UA to the Asserting Party. As another example, in the "Federate-Out" response from the Asserting Party to the Requesting UA, the header can indicate a federation-enablement response from the Asserting Party towards the Requesting UA. It could contain the result of the federation-enablement request as well as the Assertion as suitable for the federation.

The header can also be used to the carry the federation-enablement related request information from the Requesting UA to the SIP Asserting Node. Herein, the "federated-identity-uri" can be either of the following:

When the "pseudonym" parameter is marked as "true" then the "federate-identity-uri" can indicate the AOR of the user (who is making the federation-enablement request) or the GRUU of the device (whose information has to be federated out). This is a request to the Asserting SIP node to enable federation for this AOR/GRUU of the user/device and generate a pseudonym for it. This pseudonym can be used in the generation of the "federated-identity-uri" which is sent back to the requesting UA in the "Federate-Out" Response.

When the pseudonym parameter is marked as "false" then "federate-identity-uri" contains the URI that the user wants to be exposed as a part of the federation. Thus, the user has control in choosing the URI by which they want to be identified in the federation. The Asserting SIP node is expected to enable the federation by using the URI that the user had sent in the "federated-identity-uri." If the Asserting Party cannot generate an assertion for this requested URI, then an error can be returned to the user. Thus, this is a request to the Asserting Party to expose this specific URI towards the Relying Party.

The "targetURI" parameter identifies the entity towards which the Federate-out request is directed. By one approach, if this parameter is missing, then any entity within the path of the message carrying the Federate-out request can reply to the Federate-out request. By another approach, if the "targetURI" contains the address of a SIP entity/serving node such as a Registrar/Application Server, then that SIP entity is expected to honor the Federate-out request. By another approach, the user may add the "targetURI" to contain the AOR of the SIP Message Recipient (that is, the peer user participant) who is then expected to honor the Federate-out request. This approach provides flexibility wherein the user has control in choosing which entity it wants to act as the Asserting Party for the required credentials as per the Federate-out request.

It is further possible that the Requesting UA passes along a Security Assertion Markup Language (SAML) Message parameter in the Federate-Out request. This parameter would typically contain a query to the Asserting SIP node for certain credentials. The SAML Message can be indicated using a multi-part message body identified with a Content-Id (cid) parameter. By way of example, it can contain any of the following SAML query messages:

Authentication Request—Herein, the Requesting UA is requesting the Asserting Party to authenticate the user and return Authentication/Authorization/Attribute information of the user. This authentication may be bypassed if the user is currently authenticated at the Asserting Party. This parameter can be captured via the SAML primitive <AuthnRequest>.

Authorization Query—This indicates the authorization rights of the user. Herein, the requesting UA is requesting the Asserting SIP node to assert authorization and authentication information related to the user based on any existing authentication or authorization within the current context. The user is not expected to be authenticated again as a result of this authentication. This parameter can be captured via the SAML primitive <AuthnQuery>.

Attribute Query—This indicates the attributes associated with the user. Herein, the requesting UA is requesting the Asserting SIP node to assert attribute information about the user based on any existing authentication of the user. This parameter can be captured via the SAML primitive <AttributeQuery>.

A Requesting UA may add multiple federate-out headers within a single SIP message to indicate their requirement of federating-out multiple Identity Credential information (such as, for example, enabling multiple Identity Federation contexts) from the given SIP context. These multiple federate-out headers may have completely different values for their parameter information and need to be processed independently by the SIP node acting as the Asserting Party. Each of these federate-out request headers can be replied to using corresponding federate-out response headers (with some examples in this regard being described further herein).

If desired, the header can also be used in a "Federate-Out" response to carry the federation-enablement related response information from the SIP Asserting Node to the Requesting UA. The federation-enablement request may result in a success or a failure response. In these illustrative examples the "enabledisableParam" of the header can contain a value of "enable" to indicate that the Asserting Party has successfully enabled federation as requested by the UA.

Further, the "federated-identity-uri" can contain the federated-identity that is being returned from the Asserting Party towards the Requesting UA. This federated-identity-URI can be either of the following based on the request:

When the corresponding "federate-out" request contains the "pseudonym" parameter as "true," then this federate-identity-uri is made up of a pseudonym that was generated by the Asserting Party for this Requesting UA (user/Device). This "federated-identity-uri" can then be used by the Requesting UA to use federation at some other SIP Node (Relying Party).

When the corresponding "federate-out" request contains the "pseudonym" parameter as "false," then this federated-identity-uri is the same as the federated-identity as was requested by the UA. This indicates that the Asserting Node has agreed to assert the identity as requested by the UA and hence is echoing it back in the response.

Along with the federated-identity-uri, the Asserting Party could also return an Assertion in the samlMessage parameter. This assertion would be indicative of the identity information that the Asserting Party is willing to assert about the UA. This may be in response to the Authentication Request, an Authorization Query, or an Attribute Query when such parameters were present in the corresponding "federate-out" request. The Assertion parameter can be indicated using a multi-part message body and identified with a Content-Id (cid) parameter. The Assertion parameter may be contained in a SAML Response Message <Response> that follows the syntax and semantics as defined in SAML.

As a further illustrative example, the "enabledisableParam" of the header can contain a value of "disable" to indicate that the Asserting Party was not able to establish federation/assert identity information as requested by the UA. This may be due to insufficient authentication, authorization of the requesting UA, or the like. Further, a SAML Response message <Response> may be returned in the "Federate-Out" Response. This could contain the appropriate error code as well as the reason why the federation-enablement request failed. This message could follow the well-defined syntax and semantics of SAML <Response>.

The "federate-out" header can be used for disabling a federation. To illustrate, the "enableDisableParam" parameter can be filled in as "disable" by the Requesting UA. In many application settings, it may be noted that a federation disablement request is not really needed due to the design of the SIP federation model. In particular, in the SIP federation model, once a UA has made a request for enabling a federation, an Asserting Party is expected to return an assertion which the UA can present at other Relying Nodes to get assertion benefits. This usage at other relying nodes does not involve the Asserting Party, since the assertion has been returned in its entirety. Hence, any misusage or expiry of this assertion may be handled in the assertion itself. As is known in the art, the assertion can be beneficially qualified with appropriate usage directives as well as validity periods to stop its misuse.

While disabling a federation, such a header can be used for at least the following purposes:

In the "Federate-Out" request from the Requesting UA to the SIP Node (Asserting Party) (here, the header can indicate a federation-disabling request from the Requesting UA to the Asserting Party); and/or In the "Federate-Out" response from the Asserting Party to the Requesting UA; (here, the header can indicate a federation-disablement response from the Asserting Party towards the Requesting UA).

The "Federate-Out" Request header can be used in a Federation-Disablement request for an already established federation at an Asserting Party. As one illustrative example in this regard, the Requesting UA passes along the "federated-identity-uri" that was established/returned during the federation-enablement phase. Also, the "enableDisableParam" can be set to "false" and the request then sent to the Asserting SIP Node. The Asserting SIP node is expected to disable any federation that has been enabled for this URI and marks this URI as invalid for any further usage. Thus, if there are any further queries related to this URI, such queries would be failed.

A requesting UA may make a simultaneous request for disabling multiple Identity federation information, previously federated-out. This could be indicated by multiple "disable" federate-out request headers in the SIP message, each indicative of a federation-disablement request for previously enabled Identity Federations. Each of these multiple federation-disablement requests may be handled independently by the Asserting Party and responded to appropriately with the corresponding "disable" federate-out response headers.

For many application settings it may be appropriate that any assertions that were returned while enabling the federation not be invalidated by disabling this federation. They have their own validity periods and can be presented for using identity federation benefits at other node even if the federation is disabled. Thus, by this approach, any assertion returned by an Asserting Party is appropriately qualified with usage directives and validity periods.

In the "Federate-Out" Response, the header can be used in a Federation Disablement Response from an Asserting Party. An Asserting Party that has received a Federation Disablement Request (as described above) could then invalidate the pseudonym/federated-identity for the UA and return back this response. The response could contain the same "federated-identity-uri" along with a "enableDisableParam" as "disable" indicating that the Federation was successfully disabled.

The "Federate-In" header can be used for using a previous federated identity Information at a SIP relying Party. It can be used in the Federation Usage Request (also referred to as the "Federate-In" request). It can be used for at least the following two purposes:

In the "Federate-In" request from the Requesting UA to the SIP Node (Relying Party) where the header can indicate a request to use federation information from the Requesting UA to the Relying Party for the current SIP context (it could be presented, for example, along with the assertion that was received as a result of the federation-enablement request);

In the "Federate-In" response from the Relying Party to the Requesting UA where the header can indicate whether the federation information was successfully accepted by the Relying Party.

As one illustrative example in this regard, the federate-in header can be configured and arranged to observe the following protocol syntax:

Federate-In ="Federate-In" HCOLON federated-identity-uri*(SEMI federated-identity-uri-params)
    federated-identity-uri=LAQUOT absoluteURI RAQOUT
    federated-identity-uri-params=responseCode/samlMessageParam/targetURI
    samlMessageParam=cid-url The Requesting UA could populate a federate-in header with the URI of the identity that it had federated out from the home domain. In addition, one could add a URI parameter of the type Content ID URI to point to the location in the multipart message body that contains the assertion or artifact that is associated with the federated identity. So configured the federate-in header could look like:

federate-in: jheneh@domainA.com; cid=jehhenu*assertion@domainA.com

The SIP Node receiving a federate-in header could verify the credentials that are presented by the user. These credentials may be in the form of a complete assertion or as an artifact. When the credential comprise an assertion, the SIP Node can verify the credentials directly and provide a federation service to the user. When the credentials comprise an artifact, the user could resolve the artifact, using methods known in the art, with the SIP Node that issued the artifact before providing any federation to the user.

By one approach the federate-in header can be used in any SIP request message (or the 200 response to a SIP INVITE, which has an acknowledgment) from the Requesting UA to the Relying Party. By another approach, the federate-in header can be used in any SIP response that does not have an acknowledgement. So configured the header comprises a request to the Relying Party to use the credentials presented along with the request in the current context. This context may be the current SIP transaction, registration, subscription, or dialog that is being created by the SIP Request.

By one approach, the federate-in header can contain the "federated-identity-uri" that was returned by the Asserting Party when the federation was enabled. Further, a SAML <Assertion> can also be carried along using a multi-part message body. The SAML Assertion can be identified via a Content-ID and the Content-Id URI can be carried in the "samlMessageParam" parameter of the "federate-in" header.

The "targetURI" parameter identifies the entity towards which the Federate-in request is directed. If this parameter is missing, then any entity within the path of the message carrying the Federate-in request can choose to accept the Federate-in and reply appropriately. As an example, if the "targetURI" contains the address of a SIP entity/serving node such as Registrar/Application Server, then that SIP entity is expected to honor the Federate-in request. However, the user may add the "targetURI" to contain the AOR of the Session Recipient (peer user participant) who is then expected to honor the Federate-out request. This provides flexibility, wherein the user has control in choosing which entity it wants to act as the Relying Party for the associated credentials as per the Federate-in request.

A requesting UA may add multiple federate-in headers within a single SIP message, to indicate that they want to take the benefit of multiple existing federations into the current context. It is expected that the Relying Party will honor and process these various federate-in requests independently and respond appropriately with corresponding federate-in response headers (for example, as described further herein).

The federate-in header can also be used in the corresponding SIP response message (or ACK to a 200 response to SIP INVITE) from the Relying Party to the Asserting Party. By another approach, the federate-in response-related header can be used in a SIP INFO method, when the corresponding federate-in request-related header was carried in a SIP response without acknowledgement. In such an application setting it can comprise an indication about whether the credential/assertion presented in the "Federate-in" request was successfully factored into the current context.

When the assertion has been successfully federated-in, the Requesting Party is given the benefits of the federation (including benefits such as SSO, account linking, and so forth). Correspondingly a success response code can be sent in the "responseCode" parameter of the federate-in header.

When the assertion has not been successfully federated-in (as may occur, for example, when the assertion is invalid, expired, or has insufficient credentials), then a corresponding failure response code can be sent in the "responseCode" parameter. Due to a failure to federate-in some credentials, it is possible that the SIP Request itself might fail and thus this federate-in header could be contained in the appropriate SIP Error Response message. It is also possible, however, that the SIP response succeeds; in such a case the user does not receive the federated benefits. In such a case the SIP response could still be a 2xx response, but a failure response could be sent in the "federate-in" header.

With the above-described mechanisms in mind, and as an illustrative example, a user will typically register one or more contacts (devices) for a particular AOR during the Registration process. At the end of this process these contacts are registered for the user and the user can, for example, make/receive multi-media sessions from/on these contacts. A Registrar will typically allow a user to register these contacts based on appropriate authentication and authorization. Thus, at the end of the process the user has proved access to some rights/information (by demonstrating the ability to successfully register multiple contacts, the actual number/address of the contacts registered, and so forth). The user may further choose to federate these rights outside the Registrar to get advantages of identity federation. By one approach, such a user may also enable federation for that AOR (or the associated identity information) during the Registration process by using the steps described herein.

By one illustrative approach, the user makes a request for enabling federation by including the "federate-out" header in a REGISTER request. The header contains the URI that the user wants to enable for federation. This may be same as the AOR of the user or may comprise a completely different user-generated URI when the user wants the Registrar to assert a different identity based on the user credentials. It would also be possible for the user to request that the Asserting Party (Registrar) generate a pseudonym so that the real identity of the user is not exposed to the other domains. In such a case the user can add a "pseudonym=true" parameter to the "federate-out" header:

federate-out: userA@domainA.com; enable; pseudonym=true

The Requesting UA may add a SAML query message within the "federate-out" request. These queries can be a SAML Authentication Request, an Authorization Query, or an Attribute Query indicating what kind of response is expected in the Assertion that the Asserting Node (Registrar) should send back to the UA while enabling the federation.

The REGISTER message can be processed as it is done normally, that is, through authentication, authorization, and registering of the appropriate contact. Additionally, if the Registrar supports identity federation, it would accept the "federate-out" header and then decide whether to honor the request for federating out the requested user identity based on domain policy. If the user is allowed to federate out an identity as per domain policy, then the Registrar could take the necessary steps such as contacting an Asserting Party for the domain to generate credentials for the Federated identity. Such a logically distinct Asserting Party is one who can assert identity Information about the user. Such an entity may be physically co-located with the Registrar.

Figure 10:
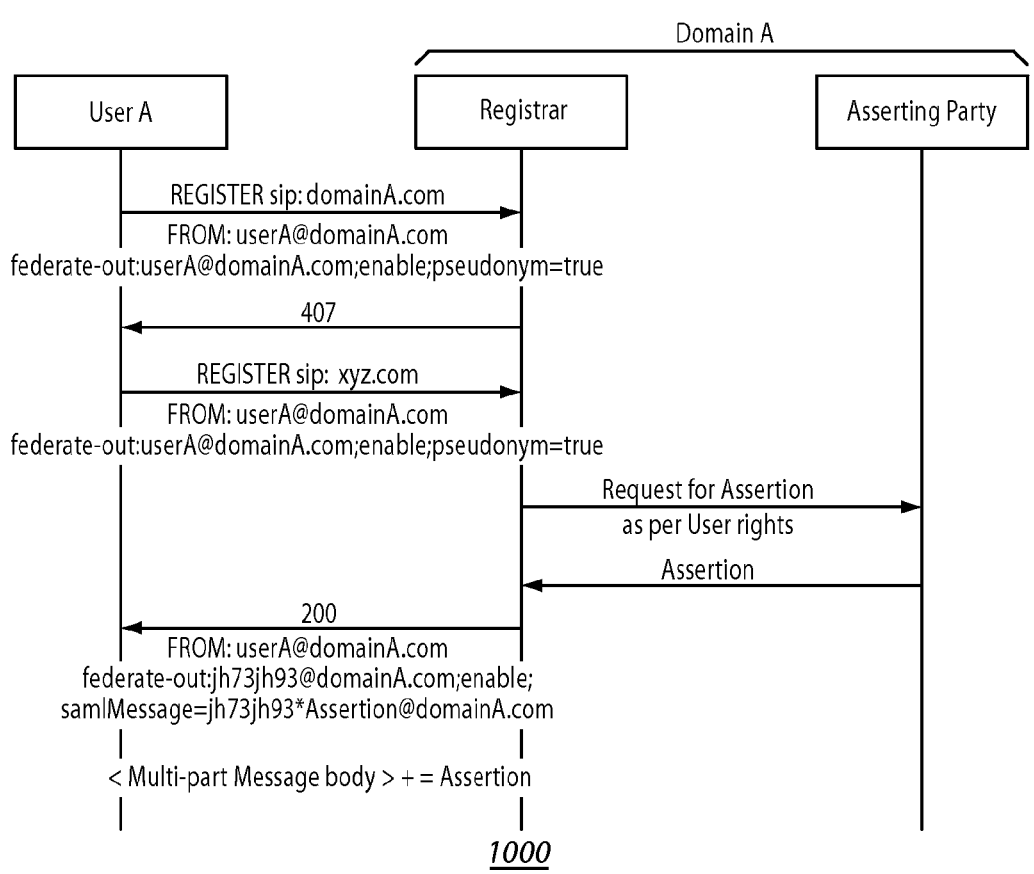
FIG. 10 comprises a call flow diagram as configured in accordance with various embodiments of the invention.

Referring generally to FIG. 10, an illustrative call flow 1000 provides an example that accords with these teachings.

The Registrar can then add a "federate-out" header in the 2xx response to the REGISTER. This federate-out header can contain the federated identity URI that the Registrar is asserting for the user. If the user has requested a pseudonym, then this federated-identity-uri can be generated using a corresponding resultant pseudonym as generated by the Asserting Party for this user. This "federate-out" header can also have a parameter pointing to the SAML Assertion (which might be included within a SAML <Response>) that is being returned as a result of enabling the federation. This SAML message can be part of a multi-part message body whose Content-Id URI is stored in the samlMessage parameter of the "federate-out" header.

As a result, the "federate-out" header in the 2xx response may look like the following:

federate-out: jhhe8hk3@domainA.com; enable; cid=jhhe8hk3*Assertion@domain.A.com

If the Registrar did not support the federate-out header, then it could simply ignore the header and there would be no federate-out header in the response. Thus, the UA would understand that the Registrar does not support federation. When the Registrar supports identity federation, however, but cannot accept the request for enabling federation because of other reasons, then it can send back an appropriate error response. In this illustrative example this error response is sent back in the form of a SAML <Response>. This can include the appropriate error responses as suitable while establishing a federation. This information may be sent in the form of the "federate-out" header itself, but with a parameter of "reject" indicating to the user that the identity federation enablement request was rejected. The header may look like the following:

federate-out: userA@domainA.com; reject; cid=userA*SAML-Response@domain.A.com

Figure 11:
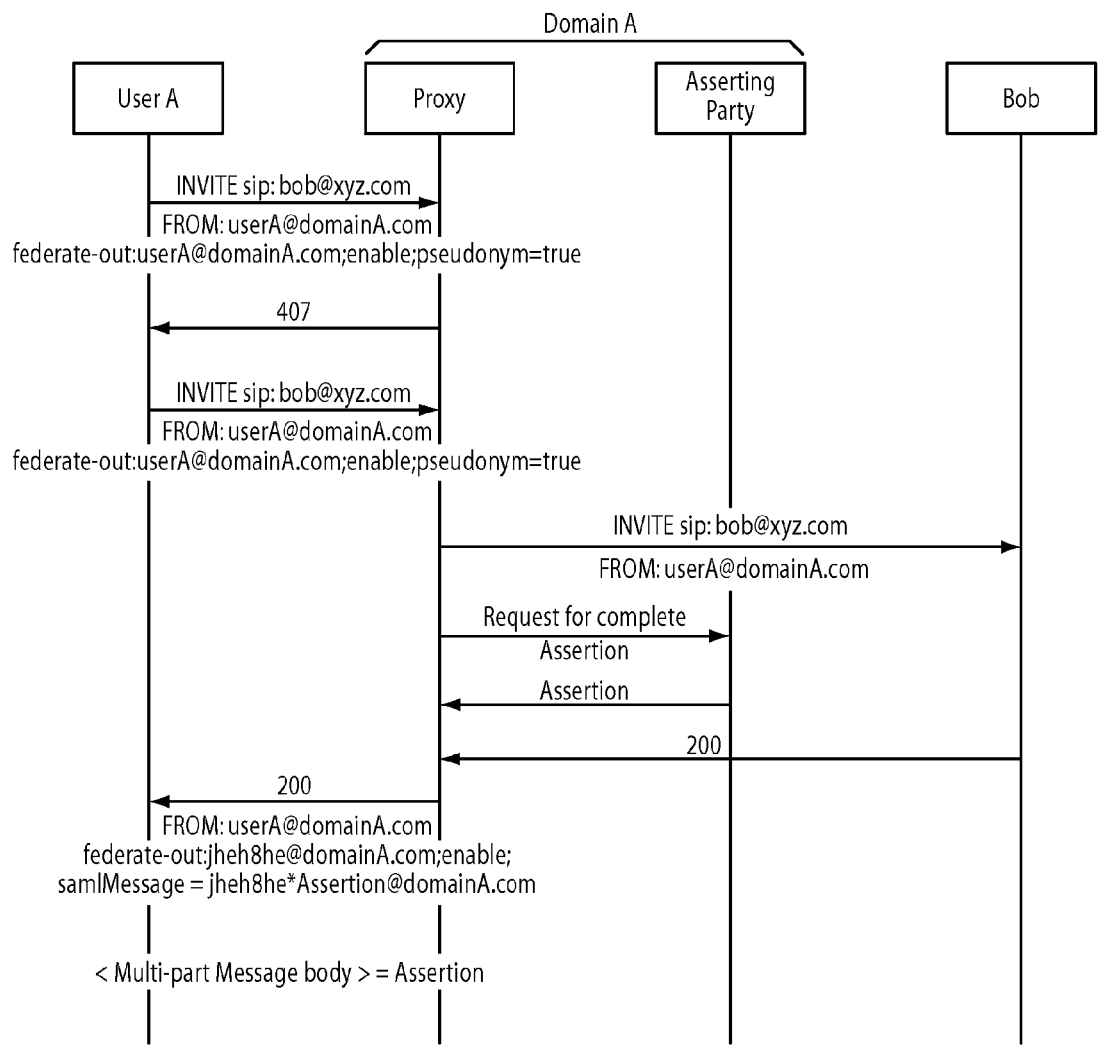
FIG. 11 comprises a call flow diagram as configured in accordance with various embodiments of the invention.

FIG. 11 presents a call flow diagram 1100 as pertains to enabling federation while making a Session Enablement Request. A user sets up a multi-media session using the SIP Session Establishment process (using the SIP INVITE-200-ACK Message sequence). While setting up the session, users are authenticated and authorized appropriately. Thus, at the end of the session establishment process, the user has proved their rights to establish a session using one of their devices and the media that were allowed in the session. Also, by virtue of having established a session with the called party, the users are indeed in a session. This information about the users (such as their right to establish the session, to use certain media streams, and being a part of an ongoing session, for example) can be asserted by the SIP call server (acting as the Asserting Party).

The semantics of the federating out of the identity can remain the same as for the Registration process noted above. One potentially useful difference may be providing that the request for federating-out is carried in an INVITE and the corresponding response is received in the 2xx response. Since, this mechanism of enabling a federation works during session establishment, the federation-enablement process will fail if the session is never established (for example, as may occur when the called party does not answer or rejects the call).

Figure 12:
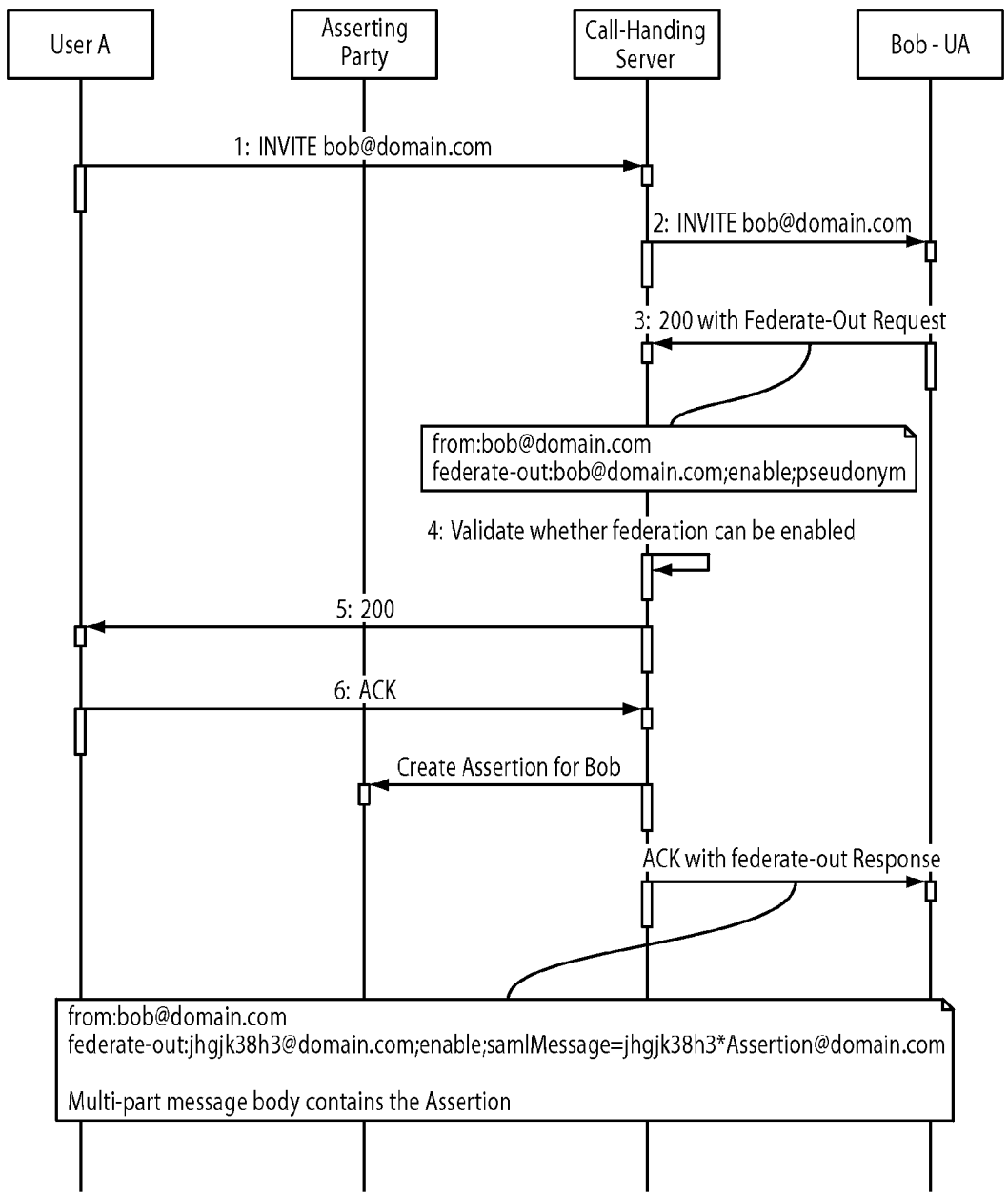
FIG. 12 comprises a call flow diagram as configured in accordance with various embodiments of the invention.

FIG. 12 presents a call flow diagram 1200 as pertains to enabling federation while receiving a session establishment request. Generally speaking, in this example, a user sets up a multi-media session when they are the recipient of a session establishment request from some other user.

Here again the INVITE-200-ACK sequence is used. The users would have previously registered for the AOR and various contacts associated with the AOR. They would have undergone authentication/authorization while registering those contacts. Thus, when the user receives a session establishment request at one of the contacts, the SIP Serving Node (Home Proxy) of the user would have done the appropriate authorization of the user before sending the INVITE towards the contact. Thus, the user is entitled to some rights as a result of successful receipt and further establishment of the session. The user may choose to enable federation for these rights by sending a federation-enablement request to the Asserting Party (such as a Home Call Server for the user).

The Requesting UA then sends the federation-enablement request in the 200 response to the incoming INVITE. This federation-enablement request would allow the similar benefits of choosing a different federated-identity or asking the Asserting Node to use a pseudonym. Further, it may include SAML Query messages as allowed in the "federate-out" request.

Correspondingly, the Asserting Node can send back the "federation-out" response in the ACK message that is sent towards the UA. This ACK can contain the appropriate "federated-identity-uri" message and content along with the corresponding SAML Assertion bodies.

Figure 13:
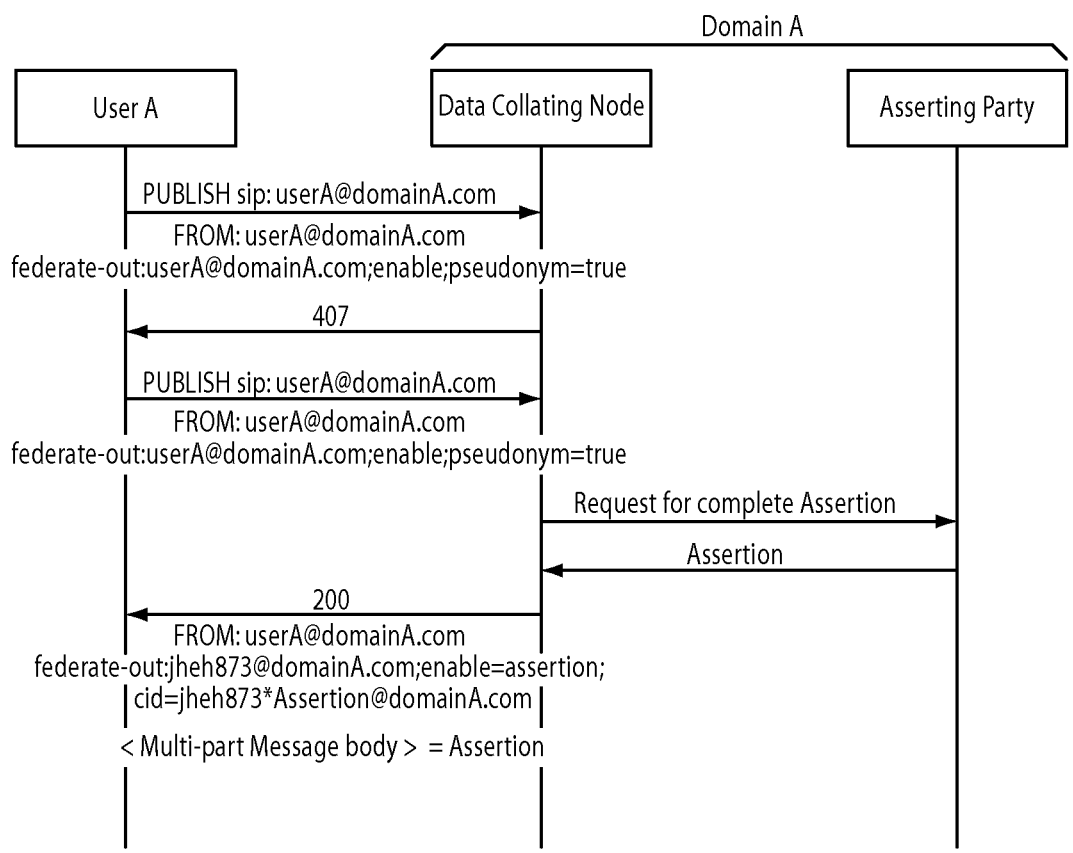
FIG. 13 comprises a call flow diagram as configured in accordance with various embodiments of the invention.

FIG. 13 presents a call flow diagram 1300 as pertains to enabling federation through Subscription/Publishing Data. In this example, a user uses the SIP Publish and Subscription (Event Notification) mechanism for publishing some information about itself or watching some state information about others. While publishing this information, the user would be appropriately authenticated and authorized. Thus, the user would have confirmed their rights to publish or watch that particular piece of information. These rights of the user may thus be federated further as per these teachings.

Again, the semantics are similar or identical to enabling a federate-out of an identity as during Registration or Session Establishment. The federate-out request can be sent in the PUBLISH/SUBSCRIBE request and the federate-out response can be received in the corresponding 2xx response. Also, in cases where the Subscription or Publish fails, the request for federation can be deemed as having failed.

To disable a federation as established by any of the above mentioned requests, the user can send a federate-out header, along with the federated-identity-Uri for which it wants to disable federation and the URI parameter set as "disable". Thus, the header would look like:

federate-out:jheh83h@domainA.com; disable

The SIP node serving the request for disabling federation for a URI can then send back a federate-out header with a URI parameter set as "disable" in the SIP response to indicate successful disabling of federation.

Figure 14:
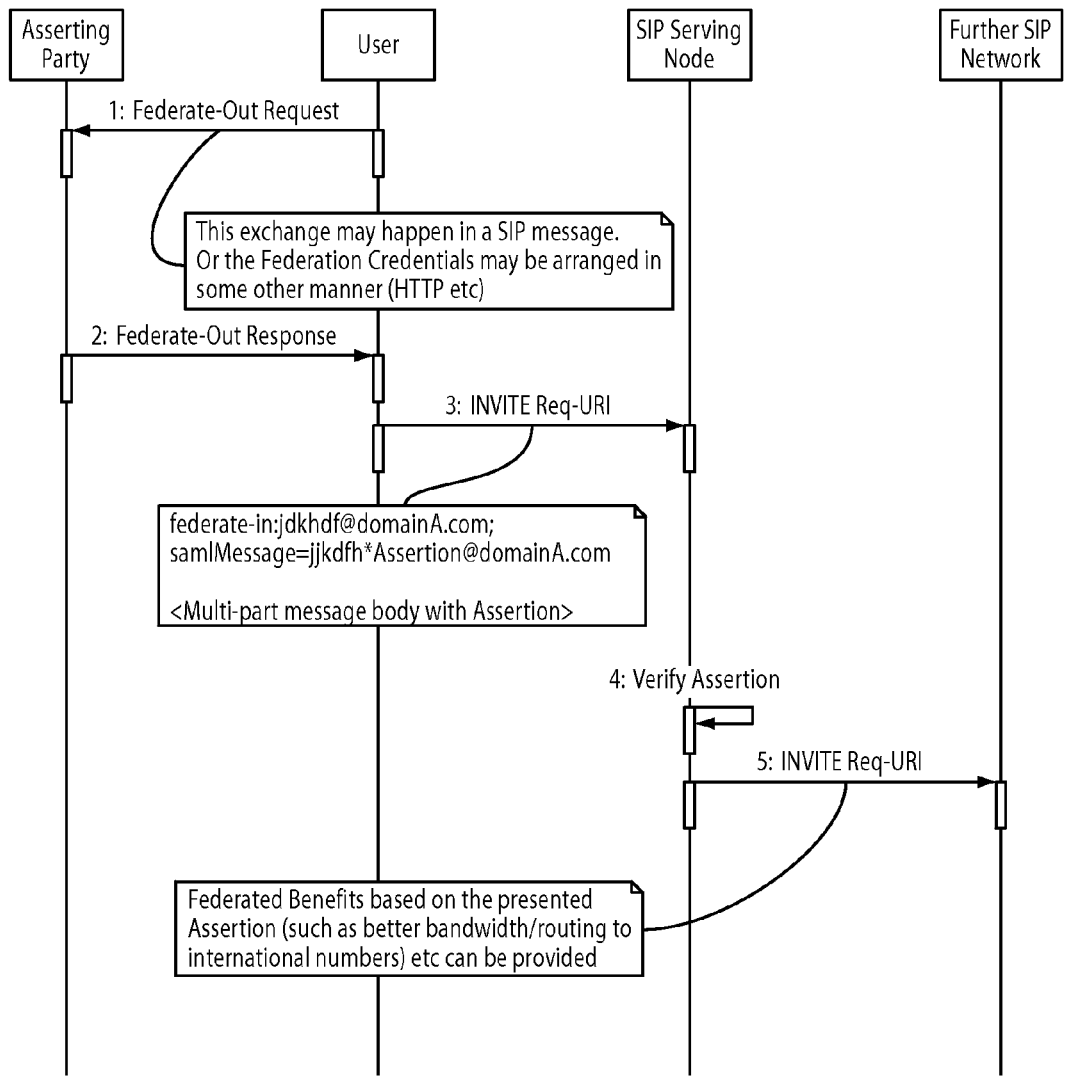
FIG. 14 comprises a call flow diagram as configured in accordance with various embodiments of the invention.

FIG. 14 presents a call flow diagram 1400 as pertains to successful federation usage for Account Linking. In this example, the user wants to use federation to get additional benefits such as accessibility to higher bandwidth or a richer media session and where a user is given federation benefits by a SIP Serving Node based on the federated credentials presented. The user has previously federated-out her identity information at a Registrar/another Serving Node, who is acting as the Asserting Party and is now federating in that identity information into the current context. The VoIP Serving Node can verify the Assertion and if it chooses to accept the Assertion, then provide associated federation-related benefits to the User, such as such as higher bandwidth, a richer media session, or the like within the current context of providing a communication service at a VoIP Serving Node.

Figure 15:
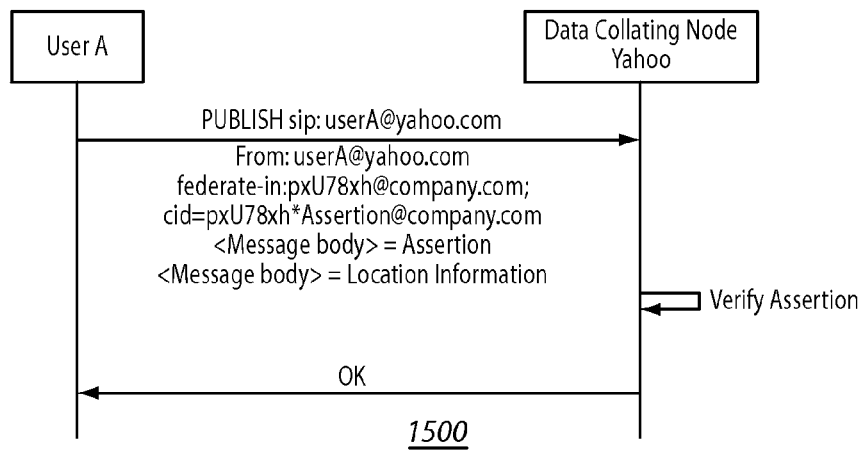
FIG. 15 comprises a call flow diagram as configured in accordance with various embodiments of the invention.

FIG. 15 presents a call flow diagram 1500 that illustrates how the account linking aspect of federation can be used to get benefits for the originating user (the user who is initiating a Session or a particular SIP Request). In this example, a user has an account with Yahoo which allows her to publish her presence information, whereas her mobile phone as is issued to her by her enterprise is GPS enabled and thus can provide her location. In this example the user links her Yahoo and enterprise accounts in such that her Yahoo messenger is able to show her presence as well as location information to her buddies.

This use-case requires a need for account linking aspects of identity federation so that Yahoo can trust her enterprise credentials to display location information along with presence content. By this approach the user can enable federating-out her enterprise identity (basically comprising, in this example, the rights to publish location information) from an Asserting Party within her enterprise (not shown in the illustration). The user then federates-in her enterprise identity (or a pseudonym as appropriate) with her Yahoo identity so that Yahoo can accept her location information.

i. Using Federation for Account Linking at the Terminating User

Figure 16:
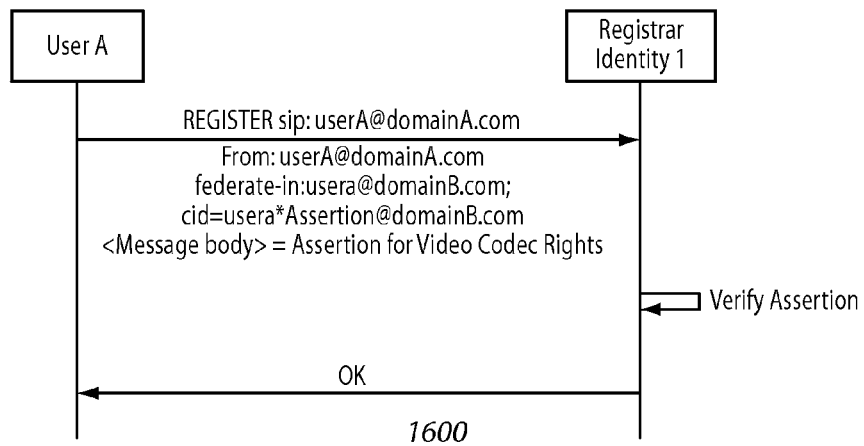
FIG. 16 comprises a call flow diagram as configured in accordance with various embodiments of the invention.
Figure 17:
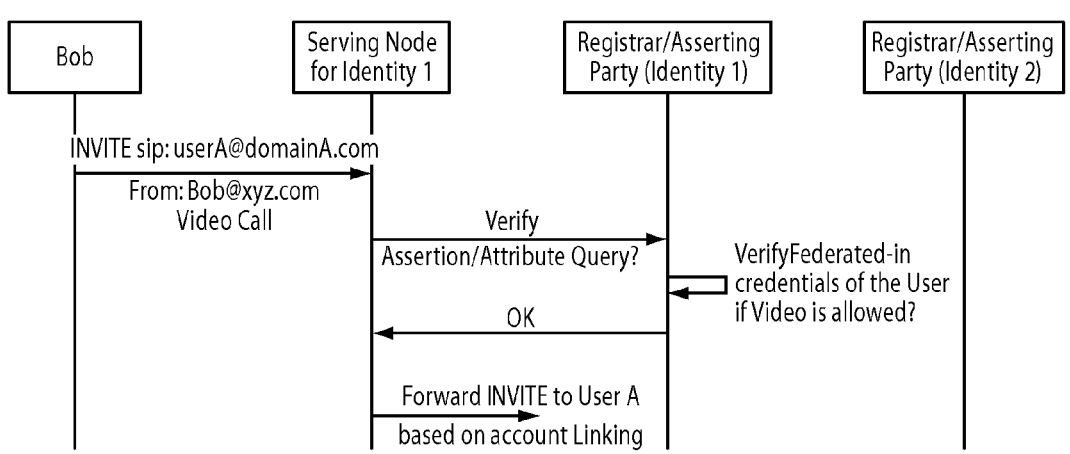
FIG. 17 comprises a call flow diagram as configured in accordance with various embodiments of the invention.

FIGS. 16 and 17 presents call flow diagrams 1600 and 1700 as pertains to using federation for account linking at the terminating user (who is the recipient of a session or an incoming SIP Request). In this example, the users typically have multiple accounts that each provide a different set of functionalities. Hence, a user may want to link up their different identities, each with individual capabilities, so that they get a benefit of using a mix of capabilities across any of the identities. In this illustrative example the user has an identity 1 that provides her speech-to-text conversion and another identity 2 that allows for video calls. Using these teachings she can cross federate both identities at the respective service providers. Now, when someone calls her at identity 1 and requests a Video call, she can leverage such federation by receiving the call at identity 1 itself while using the rights to video calling as stem from identity 2.

It is possible that a Relying Party will consider the credentials presented by a given user to be invalid or unacceptable. This may be owing to many reasons, including:

Assertion Expiry—The validity period of the Assertion has expired, and hence they are no longer valid.

Insufficient or Unacceptable Assertion information—It is possible that the credentials attributed to the user in the assertion are insufficient or unacceptable for the current context. For example, the user may be trying to setup a video session while the assertion attributes only audio capabilities to this user. As another example, the user may not be sufficiently authenticated. For example, the Relying Party may be expecting a multi-factor authentication using at least one strong authentication while the Asserting Party has authenticated using only a weaker login/password mechanism.

Insufficient trust on the Asserting Party—It is also possible that the user is trying to present an assertion from a certain Asserting Party that is not sufficiently trusted by the Relying Party (such as a SIP Serving Node). Herein, again, the Federation-enablement will fail and the assertion will be considered unacceptable.

Thus, based on the above or other reasons (as applicable for failure in accepting assertions), the Relying Party may reject the request to accept (federate-in) an assertion. Herein, the relying party can return with an appropriate error message. A generic SIP error message is proposed; 4xx—"Assertion Validation Failure". This Error Response may further contain an appropriate SAML response message body <Response> that would have a "status" field indicating the exact error. These "status" field values are already standardized by the SAML specification and thus can be re-used completely for such purposes.

Figure 18:
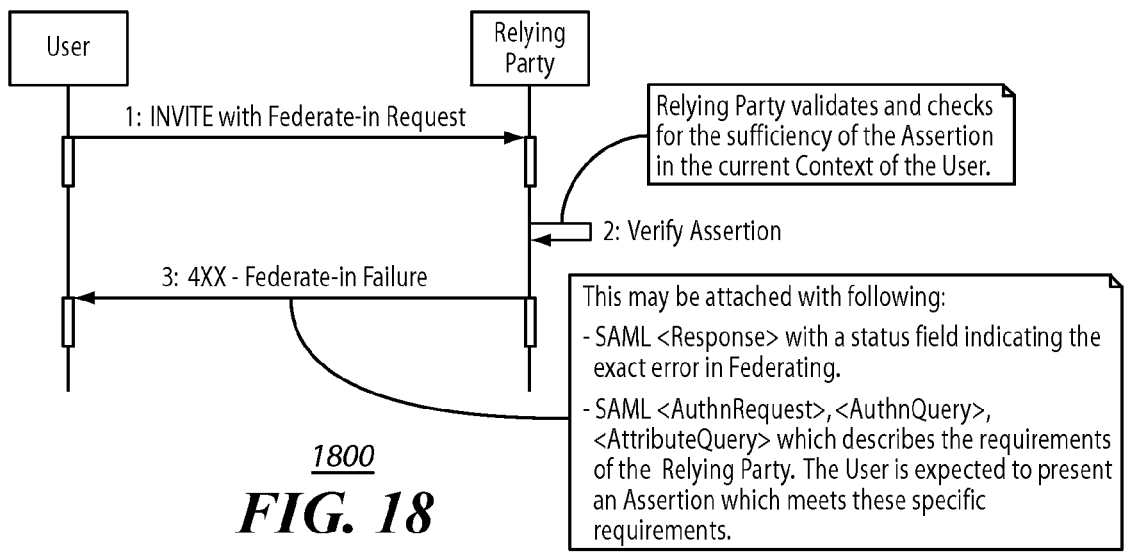
FIG. 18 comprises a call flow diagram as configured in accordance with various embodiments of the invention.

In the case, wherein the Federate-In request is rejected due to insufficient credentials, the Relying Party is expecting a specific assertion (for example, with certain specific Authentication, Authorization, or Attribute statements). The relying party may choose to indicate the specific assertion requirements in the Error Response. It could do so by including an appropriate SAML Query message such as <AuthnRequest>, <AuthnQuery>, or <AttributeQuery>. Such a SAML Request message can contain the appropriate assertion requirements that must be met by the user in a new Assertion that might be tried later. Such an approach is presented in the call flow diagram 1800 shown in FIG. 18.

If a SIP UA receives a response message to a Federate-In request, it is expected to present the appropriate credentials. It may do so by verifying the status code in the SAML <Response> that is sent by the Relying Party and then obtaining the appropriate assertions from the Asserting Party. If the Relying Party has attached a SAML Query message, then an assertion must typically be returned that comprises an answer to this Query Message.

Figure 19:
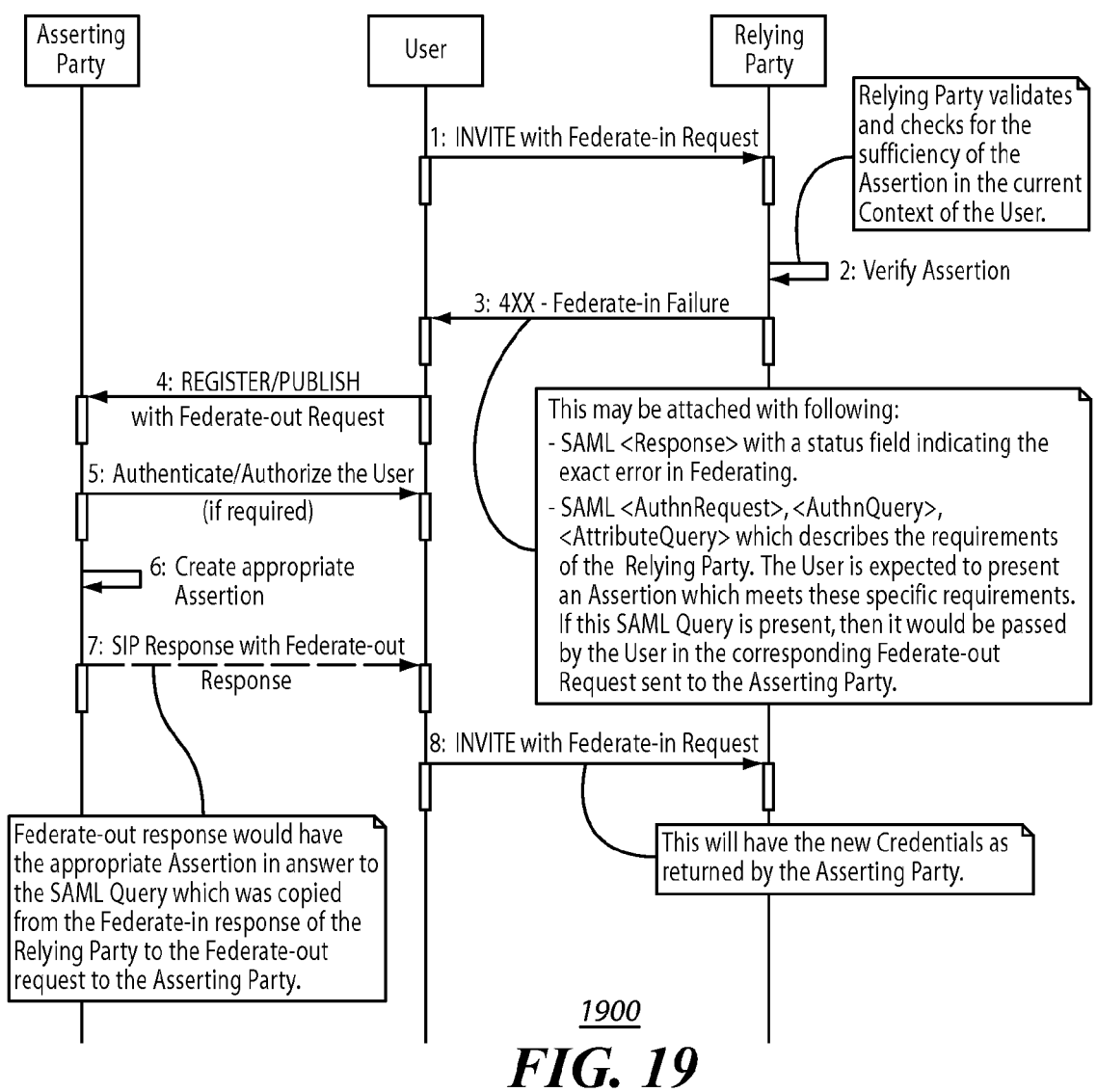
FIG. 19 comprises a call flow diagram as configured in accordance with various embodiments of the invention.

FIG. 19 presents a call flow diagram 1900 as pertains to handling a rejected Federate-In Request.

The SIP UA may do a re-registration or a re-subscription at the appropriate Asserting Party (based on whether it was a Registrar or a Data Collating Node) to get itself authenticated/authorized once again and be returned with a valid assertion. While making this Query, it can send the appropriate SAML Query message it received from the Relying Party. The assertion that is returned in the corresponding Federate-Out request can be used by the UA when it retries to Federate-In with the Relying Party which had previously rejected the Assertion.

This act of re-enabling the federation (for example, by sending out another Federate-Out request) can be done, if desired, using the following mechanisms:

When the Federate-Out request is to be sent to an Asserting Party, which can be contacted again (such as, for example, a Registrar handling a REGISTER message or a Data Collating Node handling PUBLISH messages), then the SIP UA can resend the Federate-Out request in the corresponding SIP message for that Asserting Party.

When the UA has a co-located SOAP UA, then it may use the SOAP binding to invoke the appropriate Application Programming Interface (API) with the Asserting Party. This transaction is not SIP based, of course, and would instead follow the semantics as defined by the corresponding SAML binding.

In a similar mechanism, a Hyper Text Transfer Protocol (HTTP) binding may be used as well by the UA to receive assertions from the Asserting Party.

Figure 20:
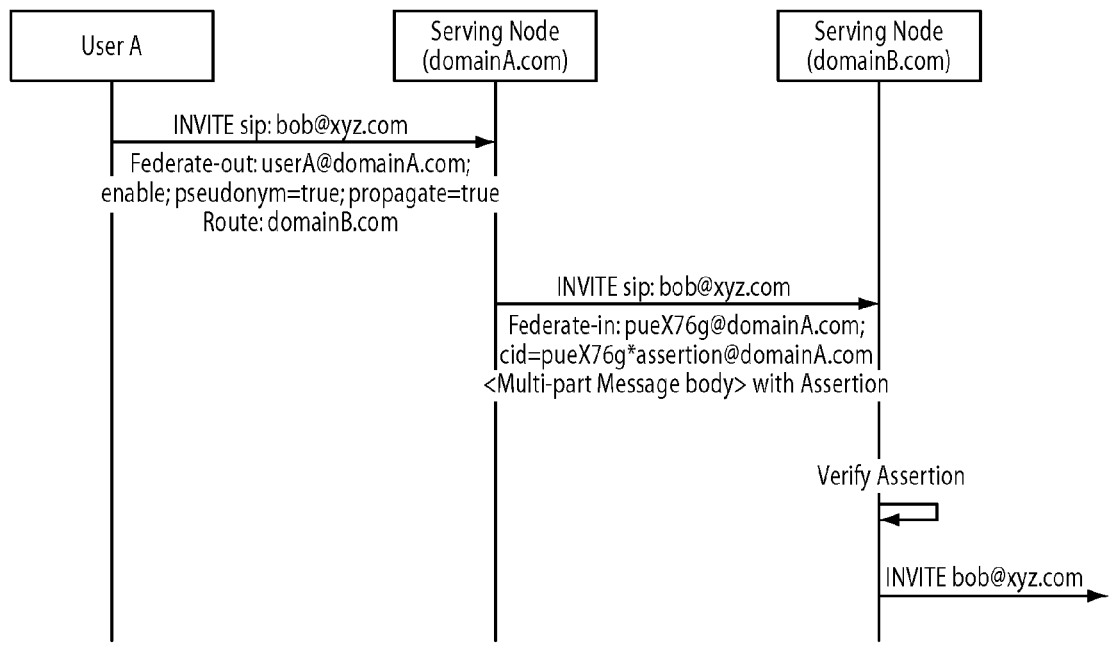
FIG. 20 comprises a call flow diagram as configured in accordance with various embodiments of the invention.

FIG. 20 presents a call flow diagram 2000 as pertains to an illustrative approach in these regards. When the Federation was enabled at a SIP Serving Node, which has transactional semantics, then that transaction cannot be simply re-done. For example, it is possible that the Asserting Party had processed a SIP request such as INVITE that has transaction semantics and cannot be repeated. In such a case it is not typically possible to send another Federate-Out request to such a Node. This Federation was enabled as a part of the processing semantics of that transactional message (such as INVITE) and hence cannot be repeated at a later stage.

Hence, a user desiring to have federation benefits at a certain Serving Node, but needing credentials (by federating out) of an identity, at another Serving Node, would need to route the request through that other Serving Node so that it can authenticate/authorize the user and then assert the appropriate identity credentials before passing on the request. As illustrated, the user could do this by including a URI parameter "propagate" to the URI in the federate-out header, with the value of "true":

federate-out: userA@domainA.com; enable; pseudonym=true; propagate=true

The presence of the "propagate' header serves as an indication to the Serving Node that it should enable federating out of an identity at the Node and propagate the federation credentials in the request that is sent out. This propagation can happen by including the federated credentials into a "Federate-In" header by the Asserting Node. Also, the UA can have added a route header to the request to indicate the next node where the Serving Node should send the request. Typically, this would be the Serving Node (where the user wants to federate-in the identity to obtain corresponding federation benefits). The Asserting Node may not add itself to the route header, thus indicating that it does not want be included in further messages involved in this transaction (for instance, reINVITE or BYE).

Figure 21:
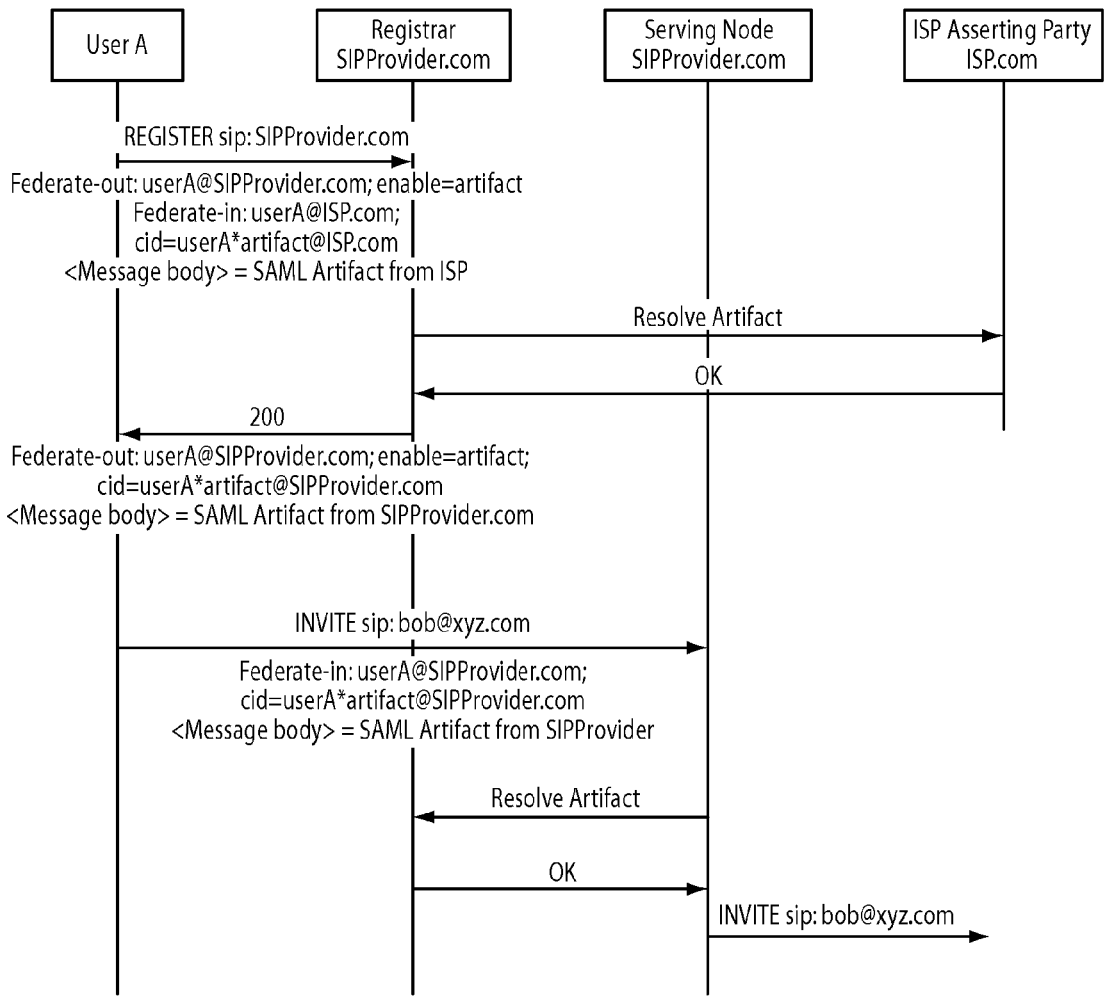
FIG. 21 comprises a call flow diagram as configured in accordance with various embodiments of the invention.

FIG. 21 presents a call flow diagram 2100 as pertains to call flows for enabling and using identity federation simultaneously. In this example a user would initiate such a simultaneous request of Federate-In and Federate-Out by including both corresponding headers. For example, in this illustrative example the user is Federating-In an identity from her Internet Service Provider (ISP) login where she authenticated and authorized her Internet access in order to obtain Single Sign On benefits while registering her device at the Registrar. By one approach, she may have received the credentials from her Internet Service Provider via a HTTP session initiated from the browser on her device. By another approach, she may have received the credentials from her Internet Service Provider via a Web-services session initiated from a web-services client on her device. In this example, she also wants the Registrar to federate out her identity so that she can use it to get Single Sign On benefits at the various serving nodes in her domain.

Here, the user has achieved access to SAML credentials from some means when she logged into her Internet Service Provider. She then Federates-In that identity at the Registrar and simultaneously requests Federating-Out her SIP identity to be used with other SIP nodes. In such a case, the headers can look as follows:

federate-in: userA@ISP.com; cid=userA*Artifact@ISP.com federate-out: sip:userA@SIPProvider.com; enable=artifact Many of the examples provided above describe how a user can have control in choosing how their federation works (for example, by specifying which identity to federate-out at which Asserting Party and when, and how to use the federation by federating in the identity at another Service Provider). Those skilled in the art will recognize this as a shift away from creating a static circle of trust in which all the Asserting Parties have access to the identity federation. This flexibility of federating in an identity on a need basis gives good control to the user in choosing their federation strategies. Additional capability for providing better and finer-grained control of this sort to the user will now be described.

When a user federates out an identity, she typically gets a SAML assertion or an artifact in return when the Federate-Out has been accepted. The user than sends this to the Relying Party to get the federation benefits. If the user opts for a SAML assertion, then the Relying Party can verify the SAML assertion without contacting the Asserting Party and provide the services to the user immediately. In such a case, however, there is chance for a breach of trust to occur as a compromise of the Relying Part and/or loss of the SAML assertion could lead to service theft or other mischief. A fraudulent user may present the stolen SAML assertion to another Relying Party and impersonate itself as the rightful owner of the SAML assertion. In fact, an un-trusted Relying Party itself may misuse the SAML credentials for over charging the user.

Another approach prompts use of a SAML artifact instead of a complete assertion. The SAML artifact is like a key to the SAML assertion that must be resolved through the Asserting Party that issued the SAML artifact. The Relying Party would not be able to verify anything from the SAML artifact unless it contacts the Asserting Party to find out the associated rights. It is this nature of "de-referencing" a SAML artifact to find out corresponding rights that can be beneficial to the user from a control point of view. Since the Asserting Party is always involved in any transaction involving the SAML artifact, it can serve as the checkpoint to ensure the authorized use of the SAML artifact.

Thus, the following description presents an optional SIP framework for the management of SAML credentials with the viewpoint of providing granular control to the user regarding the dispersion of their credentials to different parties and the usages for the same.

While Federating-Out an identity at a particular SIP entity, a user also chooses whether it wants to use the SAML credential in an assertion or artifact format. By choosing the Artifact format, the SIP Entity must inform the user about its support for the SAML credential management framework. The user needs to be informed of this so that they can pass the information on to the Relying Parties who can further decide whether they need to use the SIP-based framework for SAML credential management or other non-SIP mechanisms for artifact resolution. If the Asserting Party issuing the SAML credential supports the SIP based SAML credential management framework, then it can indicate such support in the Federate-Out header in the response to the Federate-Out Request of the user.

Such a header could appear as:
    federate-out: userA@domainA.com; enable=assertion; cid=userA*Assertion@domain.A.com; support=saml-fw Thus, when the user copies the Federate-Out header into the Federate-In header (as sent in another request towards the potential Relying Party), the "support" URI parameter would go along. A Relying Party receiving a Federate-In request with the "support" parameter as "saml-fw" would then understand that the user wants it to use the SIP based SAML credential management framework for artifact resolution.

The SIP Event Notification framework is used to get notified about some information about a particular resource, typically this information being some particular state. This state may be specific to any attributes that are related with the resource as is evident with the currently proposed states such as presence, location, or dialog information of a user.

Such a SIP-based SAML credential management framework can be based on the same philosophy of subscribing to certain information of a particular resource, specifically the information being the associated SAML assertions and the resource being the Federated-Out identity of the user. In the SIP based SAML credential management framework, the Relying Party is the "subscriber" since this party is interested in information about the user (information such as the SAML assertion that needs to be verified before providing services to the user). The user's federated-out identity is the presentity, since information about it is being distributed to the various subscribing Relying Parties whom the user has Federated-Into the current context. The Asserting Party, which originally issued the SAML artifact, is the "Notifier" that accepts the subscriptions from the various Relying Parties and sends out notifications regarding the credential information about the Federated-Out identity to the various subscribers.

Figure 22:
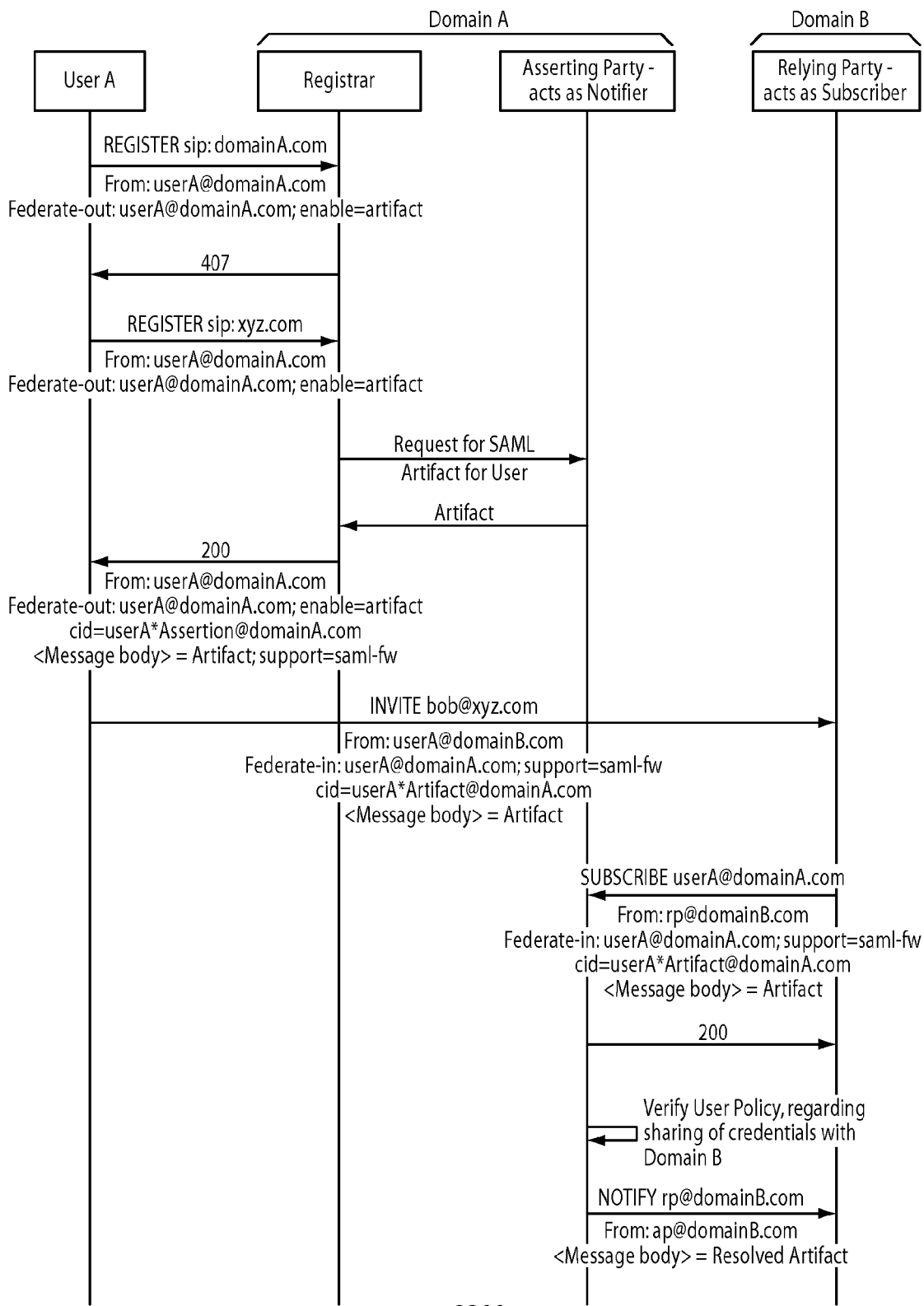
FIG. 22 comprises a call flow diagram as configured in accordance with various embodiments of the invention.

FIG. 22 presents a call flow diagram 2200 as pertains to the basic working of the SIP-based SAML credential management framework, wherein a user has registered at her domain and then is using identity federation to get SSO benefits at another domain. In this illustrated example, the Asserting Party of "Domain A" acts as the Notifier for the SAML credential information of the user.

When the relying party receives a Federate-In request with a SAML artifact, it can check to determine whether the URI parameter "support=saml-fw" is present. When the parameter is present, the Asserting Party supports the SIP based SAML credential framework which the Relying Party may use to resolve the SAML artifact. When the parameter is absent, the Relying Party must use other standardized protocols for SAML artifact resolution.

Using the SIP based SAML credential management framework, the Relying Party can send a SUBSCRIBE message towards the Federated-Out identity's domain. The AOR of the SUBSCRIBE can be the Federated-Out identity with "pres" as the service identifier. It is expected that the Federated-Out identity's domain will be registered in a DNS-SRV service using the "pres" service Identifier. This, in turn, would direct the SUBSCRIBE to the appropriate server handling subscriptions within the Asserting Party's domain. The Relying Party may use other sources to identify the server and thereby determine whom to send the SUBSCRIBE to within the asserting domain.

The SUBSCRIBE can contain the SAML artifact that the user had sent along with the Federate-In request. The SAML artifact can be encapsulated in a SAML artifact resolution request message as mentioned by the SAML specifications. Correspondingly, the Asserting Party would send a NOTIFY with the resolved SAML artifact containing the associated SAML Assertion towards the Relying Party. One additional advantage of using such a Event notification framework is that a user can leverage the standardized "watcher-info" capability to view which "watchers" are interested in their information. Thus, the user can use the watcher-info capability along with the SAML Credential framework (described above) to view which Relying Parties are resolving the SAML artifact. Thus, if the Relying Party is not acceptable to the user, they can then contact the Asserting Party to disallow the resolution of the SAML artifact.

The above examples were presented using a Session Initiation Protocol context. Those skilled in the art will recognize and understand, however, that these teachings are readily applicable using other application-layer control protocols, which can be used for creating, modifying, and terminating communication sessions using, for example, Jingle, Jabber, Skype protocol, and so forth. To further illustrate this point, some examples using a Session Description Protocol (SDP) context will now be presented.

Session Description Protocol (SDP) is typically used in VoIP signaling protocols like SIP to describe multi-media sessions so that UA devices can exchange these descriptions and decide on the specifics of the multi-media session that they want to setup. SDP is powerful enough to completely describe the requirements as well as the capabilities of the multi-media session being setup. There is also an Offer-Answer model defined for SDP to permit users to negotiate and then choose the SDP description that is suitable for both communicating parties. This Offer-Answer model is carried within the SIP signaling and there are well-defined call-flows (including multiple handshakes within a single session) that dictate how the negotiation will happen to ensure successful multi-media set up.

SDP, by design, is limited in scope to describe the media capabilities of the session being set up. It completely leaves the authentication and the authorization mechanism to the session establishment protocol (such as SIP) that is carrying the SDP.

Indeed, session establishment protocols like SIP are well-adapted to implement the authentication and/or authorization requirements prior to any multi-media session setup. Such protocols describe authentication and authorization for the complete session being set up (for example, the SIP INVITE message). A single communication session (such as, for example, a SIP call), however, may have multiple media-streams (for example, audio and multiple video streams in a rich multimedia call). Thus, whatever authentication and/or authorization are done for the session is mandated for all the media-streams that were set up as a part of that session. It is not possible to define and then implement authentication/authorization requirements on a per media stream basis.

On the other hand, in increasingly complex multi-media exchanges such as those required for seamless mobility between devices, networks, and domains, there is a need for flexibility when it comes to handling and moving media streams. Limiting all the media capabilities of a single session to the same authentication/authorization requirements is not necessarily a valid assumption for all seamless mobility application settings. For example, during a video call by an employee with an outsider, an audio stream within a session may be established with the existing authentication mechanism, yet the video stream may be set up only if the employee proves to be above a certain employment grade. As another example, a user may want to share a presentation during the call, but can do so only when the other party in the session can prove their right to view that presentation (for example, by producing their employee credentials).

In order to support flexibility of authentication and authorization requirements on a per-media stream basis within a SDP session, the present teachings may be extended to an SDP application setting.

The Offer-Answer semantics of SDP define a model, wherein one participant offers the other a description of the desired session from their perspective, whereas the other participant answers with the desired session from their perspective. Such a negotiation model allows for any two participants to choose those media characteristics which are applicable to both of them.

Figure 23:
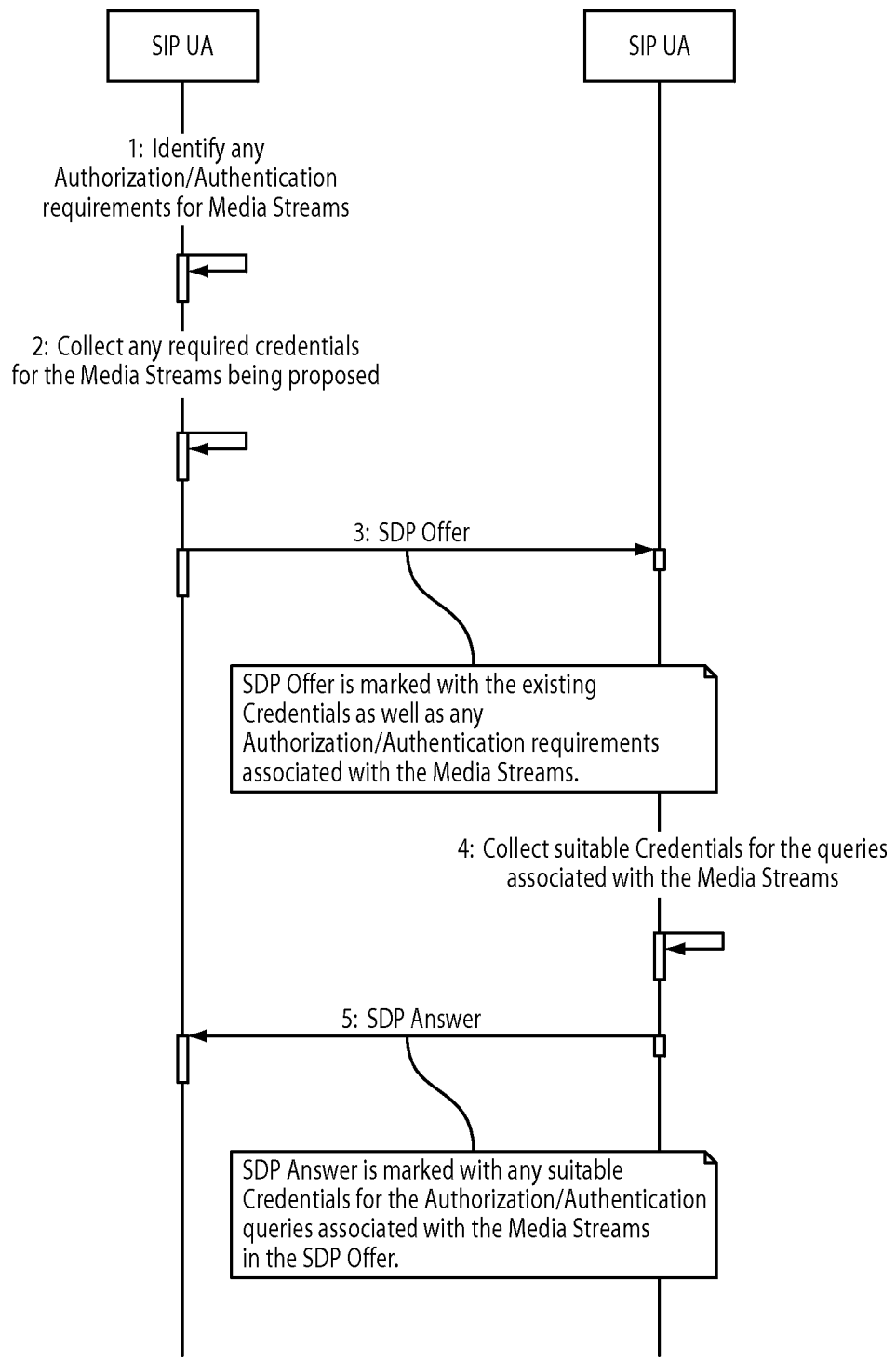
FIG. 23 comprises a call flow diagram as configured in accordance with various embodiments of the invention.

FIG. 23 provides a call flow diagram 2300 as pertains to identify-federation enabled through use of an SDP Offer-Answer model. By one approach one can re-use the negotiation capabilities of the SDP Offer-Answer model to enable identity federation.

In the SDP Offer phase, the SIP UA may mark the media streams with the following.

The appropriate credentials, when the Offering UA already has some credentials for these media-streams and would like them to be verified by the other UA/nodes, so that the media stream can be setup.

Any authorization/authentication requirements associated with the media streams. Here, the UA wants to associate some requirements with the media-streams before they can be accepted and setup between the two parties.

The SDP Answer-Phase is marked with any suitable credentials for the authentication/authorization queries associated with the media streams in the SDP Offer. If the UA cannot produce the sufficient credentials, then those media-streams can be rejected. When a media stream that had a corresponding authentication/authorization query is accepted by this UA, then it can be attached with a corresponding assertion that can answer those queries.

These teachings will facilitate carrying the identity federation related requirements and assertions on a per-media stream. Hence, a new attribute parameter can being identified that can be carried in such a media-description. In this illustrative approach this attribute parameter can be defined as follows:

a=identity-federation:<SAML Assertion Query and/or Response messages>

The Query and Response information about the identity federation can be captured as a Content-Id URI that identifies a SAML message body within the multi-part message body. Thus, when SDP is enhanced with identity federation, a multi-part message body can be used. One part of the message body is the SDP itself, and the other part(s) can include the other SAML Queries/Assertions as suitable for the current SDP (either Offer or Answer). These SAML bodies are then tagged with a Content-Id and identified with a Content-Id URI.

The exact SAML message body can be based, at least in part, upon whether the SDP is a part of the Offer/Answer and whether the UA is asking for some identity information or is providing some assertion. These cases are covered as follows and explained with the corresponding SAML message bodies that would be used.

Identity Federation Messages within a SDP Offer

Requesting for Some Authentication/Authorization Information

Here, the UA may include some SAML query message such as Authentication Request, Authorization Request, or Attribute Query. These basically comprise a SAML query message to the other UA that requires a response before this media-stream can be successfully established. In this approach, the UA is asking the other UA to prove some identity, authorization rights, or attributes before this particular media-stream can be established. The Answering UA is expected to return the respective credentials (such as responses in the form of assertions) along with the corresponding media-streams in the SDP Answer.

This URI can be in the form of a CID URI, which will point to a SAML <AuthnRequest>, <AuthnQuery>, and/or <AttributeQuery>

Presenting Some Identity Credentials

It is also possible for the UA to assert some identity information while offering a media-stream. This is an indication from the UA that it already possesses some credentials for setting up this media stream and they can be verified by the other UA prior to accepting this media session. This URI can be in the form of a CID URI that will point to a SAML <Assertion> message. The Answerer UA is expected to receive these credentials and to verify them. If these credentials are found to be inappropriate or insufficient, the Answerer UA may reject these media-descriptions.

It is possible for a single media-description to contain both a request as well as an assertion simultaneously. This indicates that the UA is not only presenting some existing credentials but is also asking the other UA to present some credentials prior to establishing this session.

Identity Federation Messages within a SDP Answer

Presenting Credentials in Response to the Queries Contained in the SDP Offer

Here, the Answering UA is answering the SAML Queries that were asked in the SDP Offer. These answers are in the form of an appropriate SAML <Assertion> having sufficient credentials. The Offering UA is expected to verify these credentials. If these credentials are acceptable then the media session continues as has already been set up by the Offer-Answer model.

When these credentials are invalid or insufficient, however, the Offering UA may terminate the media session completely (for example, by sending a BYE) or refuse to setup the media stream by sending another session message (such as a re-INVITE with rejected media description) while rejecting this media stream.

A few illustrative use cases based on VoIP identity federation technologies will now be presented.

This first Use Case describes how the present teachings can be used to enable Identity Federation between a SIP Service Provider, such as an IMS network provided by a Cellular operator and an Instant Messaging Solution Provider on the Internet. This use-case handles Identity Federation-related brokering of two services: Presence and telephony. Either of the services may be provided by using known practices in this regard.

Identity Federation-Enablement

Here it may be assumed that the various involved users have different identity affiliations (such as, for example, belonging to different administrative domains). The following assumptions also apply in this example:

The presence service is hosted by an administrative domain such as yahoo.com, referred to as SP #2 in the illustration.

The telecom-related or IMS functionality is provided by the telecom operator and is thus affiliated to an administrative domain such as www.verizon.com, referred to as SP #1 in the illustration.

Figure 24:
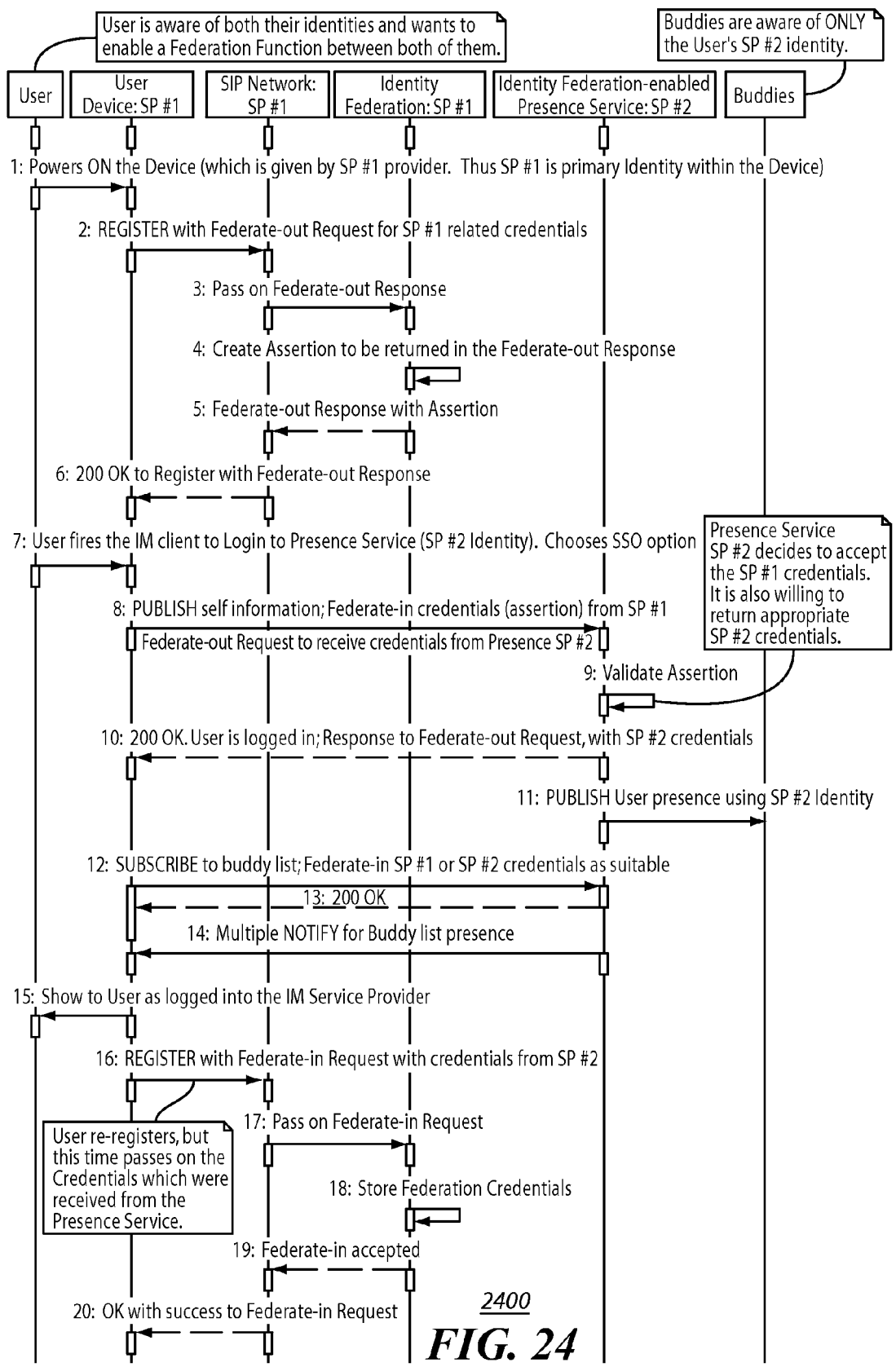
FIG. 24 comprises a call flow diagram as configured in accordance with various embodiments of the invention.

As shown in a call flow diagram 2400 in FIG. 24, using the present teachings a user can Federate-out their credentials at a services provider comprising a Telecom Operator (SP #1) whilst sending the REGISTER method for registering their contacts. Appropriately, the SP #1 generates the required credentials using the Identity Federation function and returns them to the user. The user then uses these credentials for federating-in to the context of publishing their presence information to SP #2 for the purpose of receiving SSO service and benefits. The user also asks for receiving the credentials from SP #2, which are later federated-in to the context of the SP #1 by resending the REGISTER method with a Federation-usage request. Thus, the SP #1 and SP #2 are now federated with each other for the user, and the user can avail Federation-related benefits at either of them as described further herein.

Figure 25:
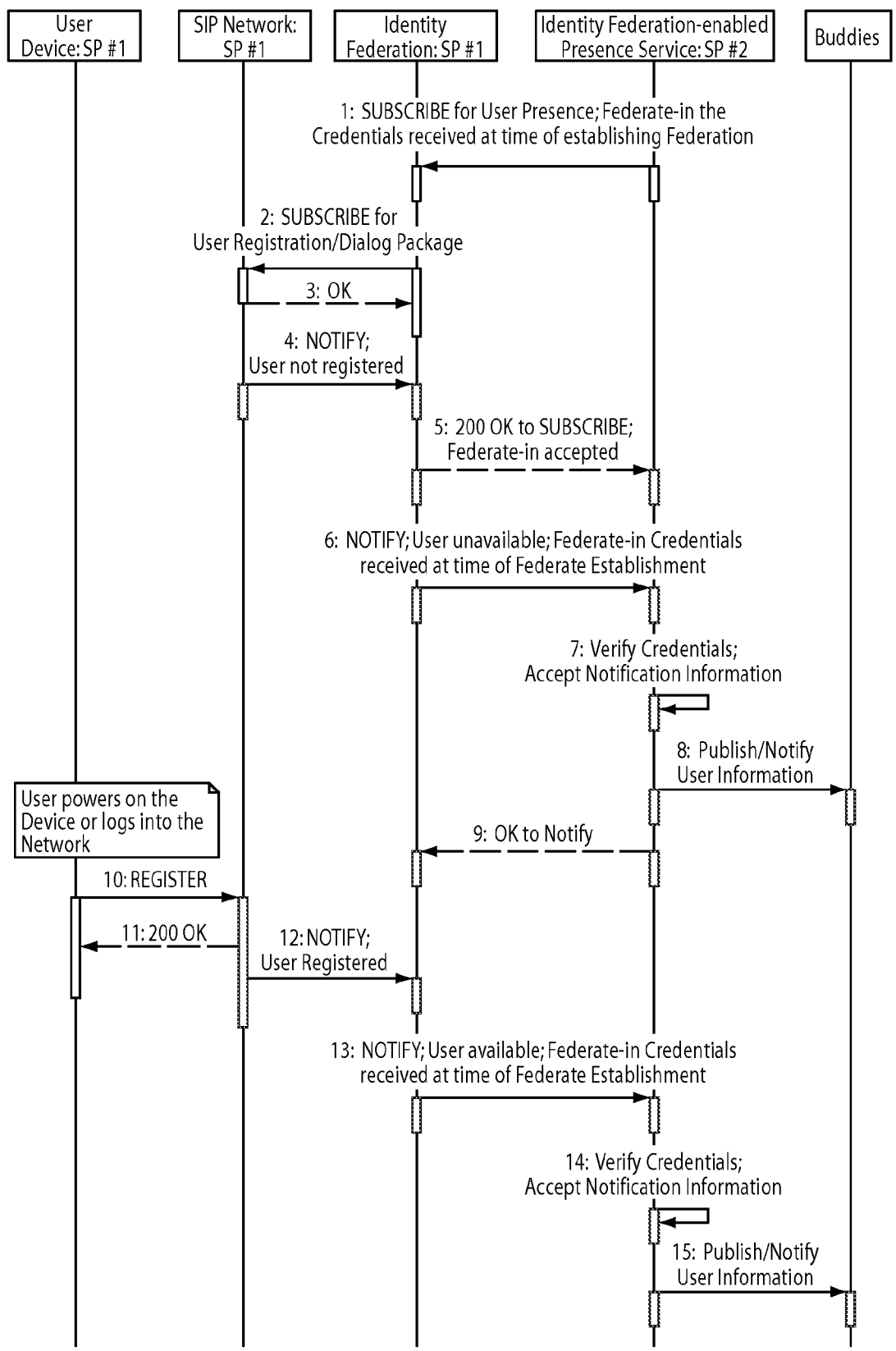
FIG. 25 comprises a call flow diagram as configured in accordance with various embodiments of the invention.

FIG. 25 depicts via a call flow diagram 2500 how the Identity Federation, as established above, can be used for user and SP-related benefits. This use-case begins when the user is not logged into the network. The SP #2 is interested in knowing user availability, which can be decided based on the whether the user is available on their mobile phone and/or is busy talking on their phone or not. SP #2 initiates a SUBSCRIBE message for user presence and availability information towards the SIP network controlled by SP #1. It supports this message using the Federate-in request and using the credentials that were received when the user had established the federation between SP #1 and SP #2. SP #1 validates the request and accepts the Federate-in request. It further sends a NOTIFY message indicating un-availability of the user to SP #2, but this time it uses the credentials that were received from the user as described above with regards to FIG. 24. When the user logs into the SP #1 network, their availability information can be updated to SP #2 using the NOTIFY mechanism. Again, however, SP #1 can use the identity credentials received earlier. One advantage of such a solution is that the user is able to ensure that their identity-related information (presence and availability) is used across different service provider administrative domains. At the same time, identity federation ensures that the real identity of the user in each domain is not shared with the other; by the illustrated approach only the corresponding pseudonym is shared, thus upholding user privacy requirements.

Figure 26:
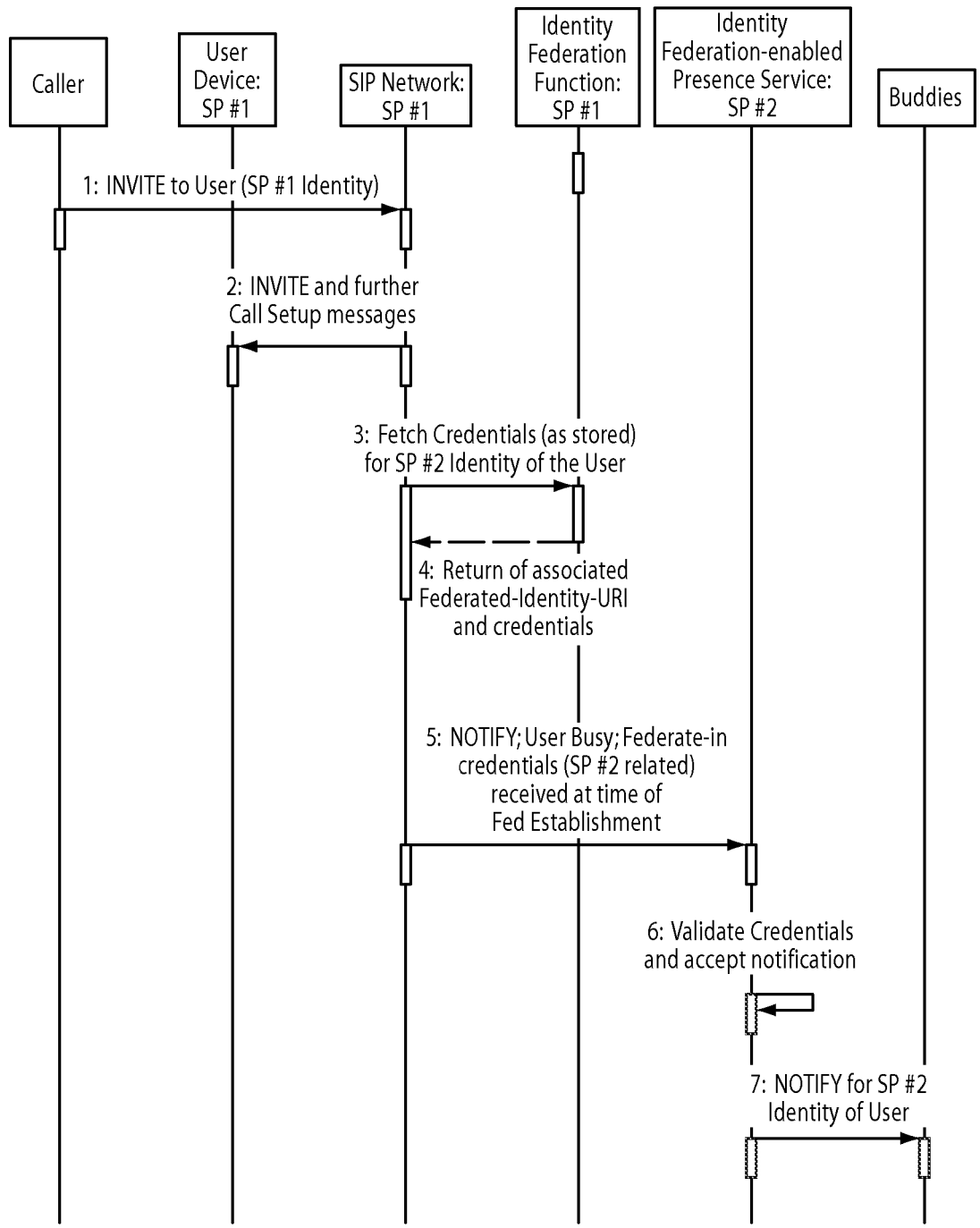
FIG. 26 comprises a call flow diagram as configured in accordance with various embodiments of the invention.

Similarly, FIG. 26 depicts via a call flow diagram 2600 how the identity federation mechanisms described above and herein can be used for updating presence information for a federated identity. When the user receives a Session Establishment Request (SIP INVITE) to their SP #1 identity and the call is established, the SP #1 Identity Federation function can update the SP #2 presence service regarding the change in the status of the user. This information can be pushed by the presence service to the various buddies of the user who have subscribed to the user's SP #2 identity. Thus, the user receives a federated benefit, wherein their availability on one network (the SP #1 SIP network) serves to reflect their availability on another network (the SP #2 Instant Messaging network).

Figure 27:
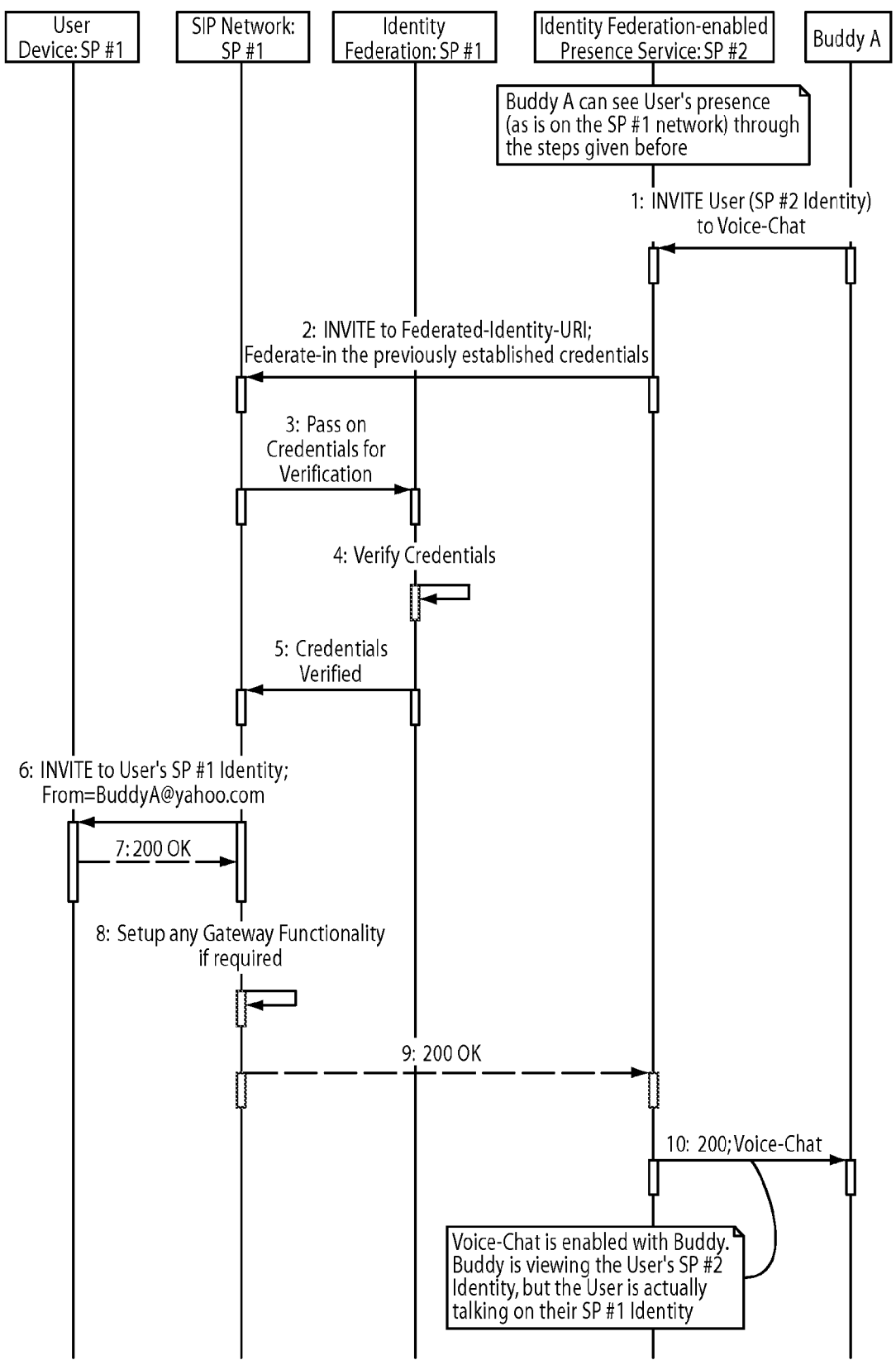
FIG. 27 comprises a call flow diagram as configured in accordance with various embodiments of the invention.

Referring now to FIG. 27, a call flow diagram 2700 depicts an extension of the above use-case wherein a buddy initiates voice-chat from a messenger service for the user's SP #2 identity and the user receives the content as a voice-call on their mobile telephone using their SP #1 identity. Using the identity federation mechanisms described earlier, it is possible for the user's buddies on the SP #2 network (that is, an IM network), to view the user's availability even when the user is available on the SP #1 network (that is, an SIP/cellular network). Now, when a buddy initiates a voice-chat with the user, the presence service can route the request towards the user's SP #1 identity (that is, the federated identity). The SIP network within SP #1 can then verify the credentials passed on by the presence service and choose to route the Request towards the user's device, which is registered with SP #1 credentials on the SP #1 network. Thus, using the identity-federation techniques described herein, it is possible for the user to have a session where the peer session participants receive an impression that they are talking with a specific identity of the user notwithstanding that the user may be currently logged into another identity.

As yet another example, consider now a user who has federated his home phone with his official number, and configured a policy that his official calls be forwarded to his home phone/mobile phone based on some conditions (time-of-day, presence, location, or the like). Since the home phone is a shared device, it may happen that it is answered by someone else. Also, even though the mobile telephone is considered to be personal, many times it is answered by a family member.

For some official calls (mostly from customers) it must be guaranteed that the responding user is indeed the valid recipient of the call. In this example, such calls can be marked with some corresponding identity credential requirements. A user would not be able to receive this call (that is, they would not be able to accept it (or even if they accept it, it would be immediately torn down)) until they provide the necessary identity credentials. Using the teachings described herein, the user would be able to hold the call and produce the required credentials (for example, by logging into the company website to receive the credentials or by using a smart card or biometrics). These credentials would be returned in an 18X response to the INVITE and only when the other party (or the intermediary Call Server) is satisfied of the credentials will the call then be established.

Figure 28:
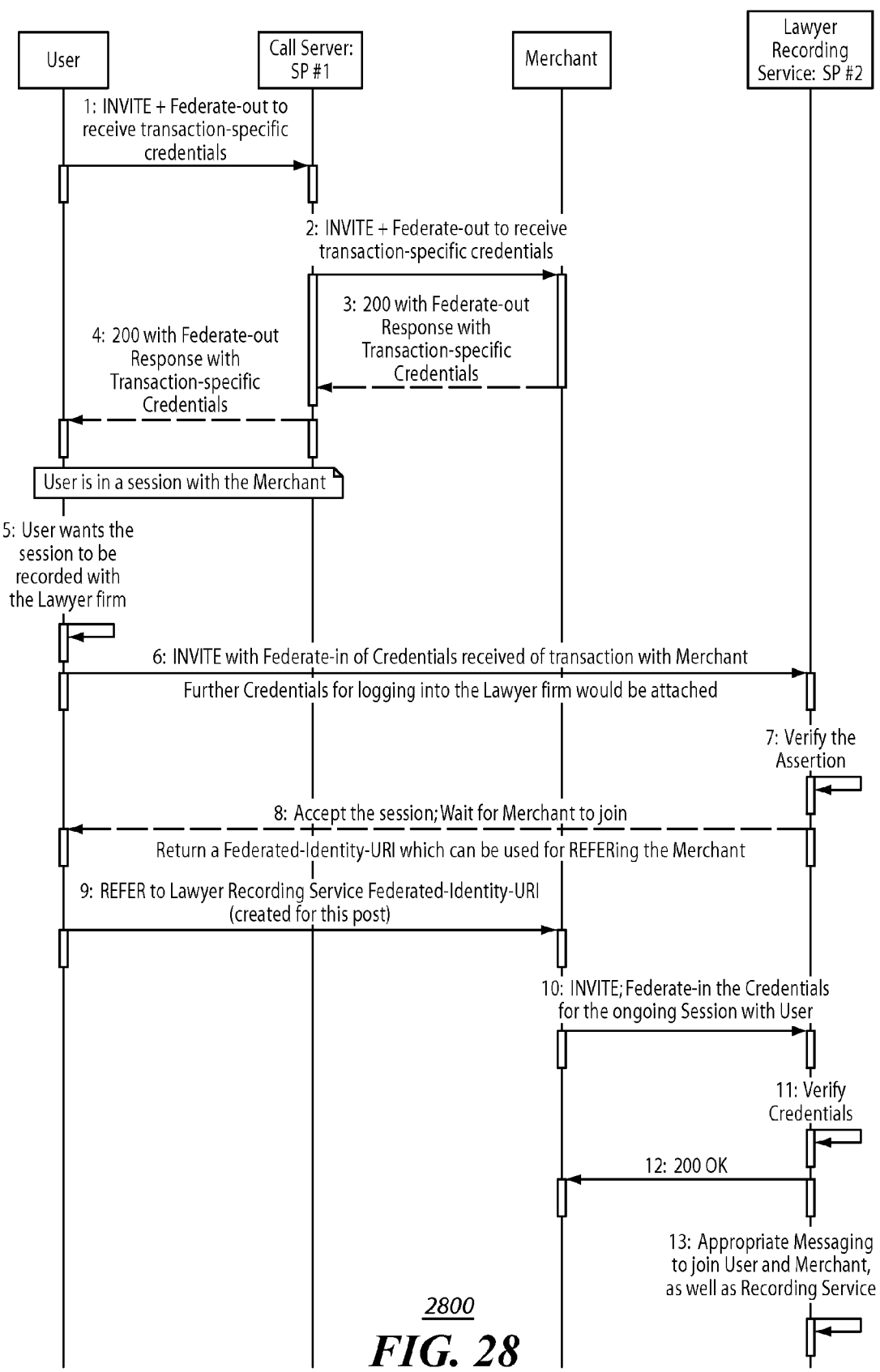
FIG. 28 comprises a call flow diagram as configured in accordance with various embodiments of the invention.

FIG. 28 comprises a call flow diagram 2800 that illustrates an approach to employing these teachings to transfer an ongoing session to another domain. For example, a given user may be in a voice call with a merchant, using the telecom services provided by her telecom operator (SP #1). In this example, however, she would like the conversation to be recorded by her legal representative that is in a different administrative domain (SP #2). This scenario hence illustrates a need for identity-federation enablement between the user's different identities (that is, her telecom identity and the credentials associated with her account with her legal representative). The user sends a request to federate-out the credentials from the session which is ongoing with the merchant using the SP #1 network. The user then passes on these credentials whilst establishing a session with the legal representative. The user also sends a federate-out request to the legal representative asking to federate-out credentials for the current transaction that can be used whilst joining the session. The user then passes on these credentials to the merchant using the SIP REFER method, by adding them to a federate-in context with the merchant. The merchant executes the REFER method and also uses the credentials that were federated into the REFER context. As a result, the merchant sends an INVITE towards the legal representative who can then verify the assertions for the transaction with the user and then join the user and the merchant into a single session while at the same time triggering the recording service.

1. Enabling Seamless Mobility Between Administrative Domains

Figure 29:
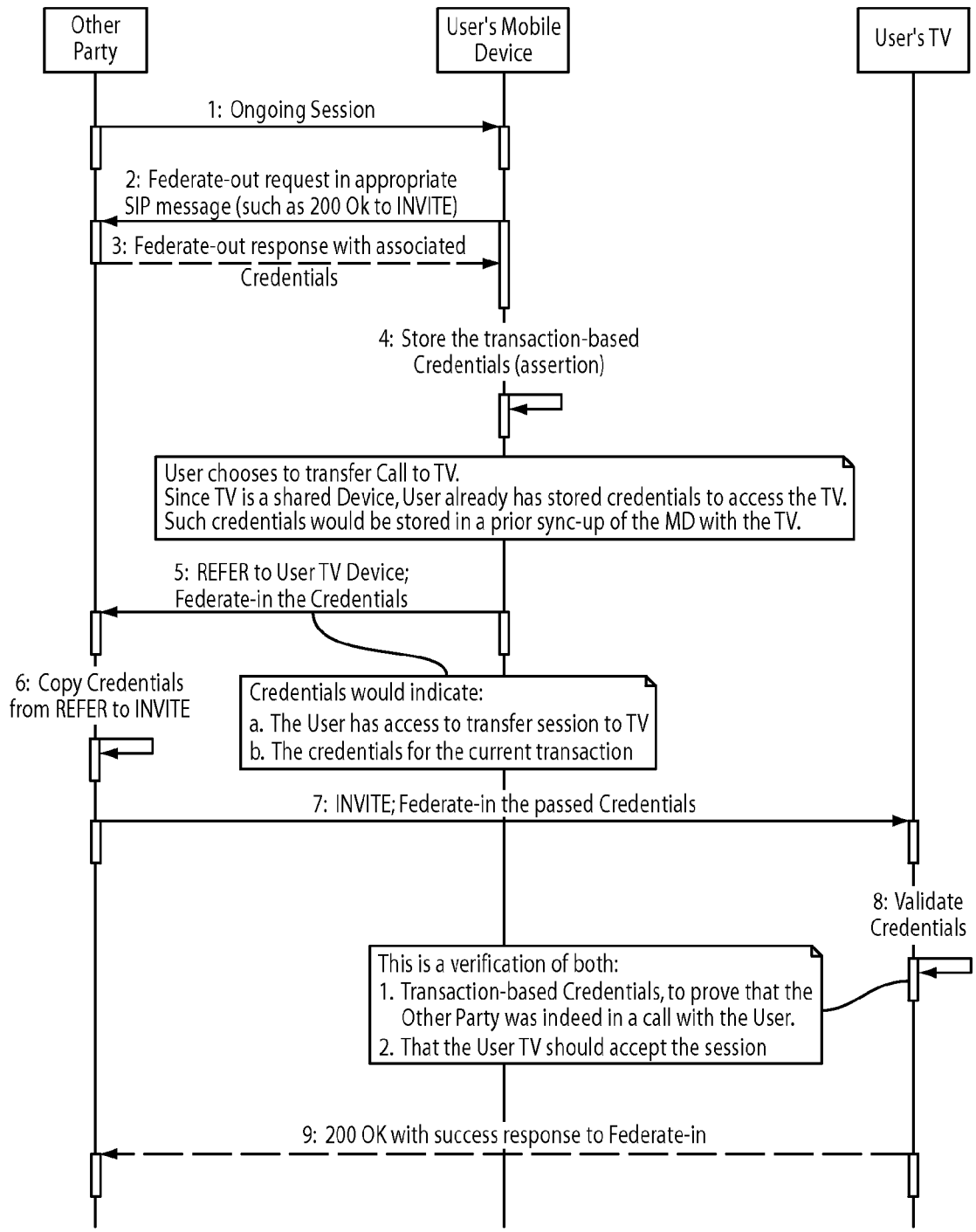
FIG. 29 comprises a call flow diagram as configured in accordance with various embodiments of the invention.

FIG. 29 comprises a call flow diagram 2900 that illustrates a use-case to showcase the need for identity federation whilst transferring a session from one device to another device/user that belong to the same (or different) administrative domains. Here, the user has an audio call on his mobile telephone. When he walks into his home, he transfers the session to this television, computer, or other device having a relatively large display as compared to the mobile telephone. For this, the user sends a federate-out request within the current SIP transaction to enable federating-out the corresponding credentials for the current transaction. These credentials are then associated with the credentials that the user would have pre-stored on the user device, which allow the user device to access the television (which is essentially a shared device) between the user and other family members. Both these credentials are added to the REFER message, which is sent towards the peer participant within the ongoing call session. The peer participant can copy the federated-in credentials into the resulting INVITE (as a result of the REFER), which is sent towards the television. The television device is now in a position to verify the appropriate credentials; i.e, that the peer participant is indeed in an ongoing session with the user (proved by credentials from the ongoing transaction between the user and the peer-participant) who has the appropriate credentials to transfer a session to the television device (proved by credentials which give the user permissions to access the television device). The television device can thus allow the peer participant to setup the session. From the user's perspective, this is equivalent to a seamless mobility experience, wherein the ongoing audio session is transferred to the television device notwithstanding that the mobile phone and the television device are ordinarily associated with different credentials. Those skilled in the art will recognize that the television device may belong to a different user and/or a different administrative domain.

Figure 30:
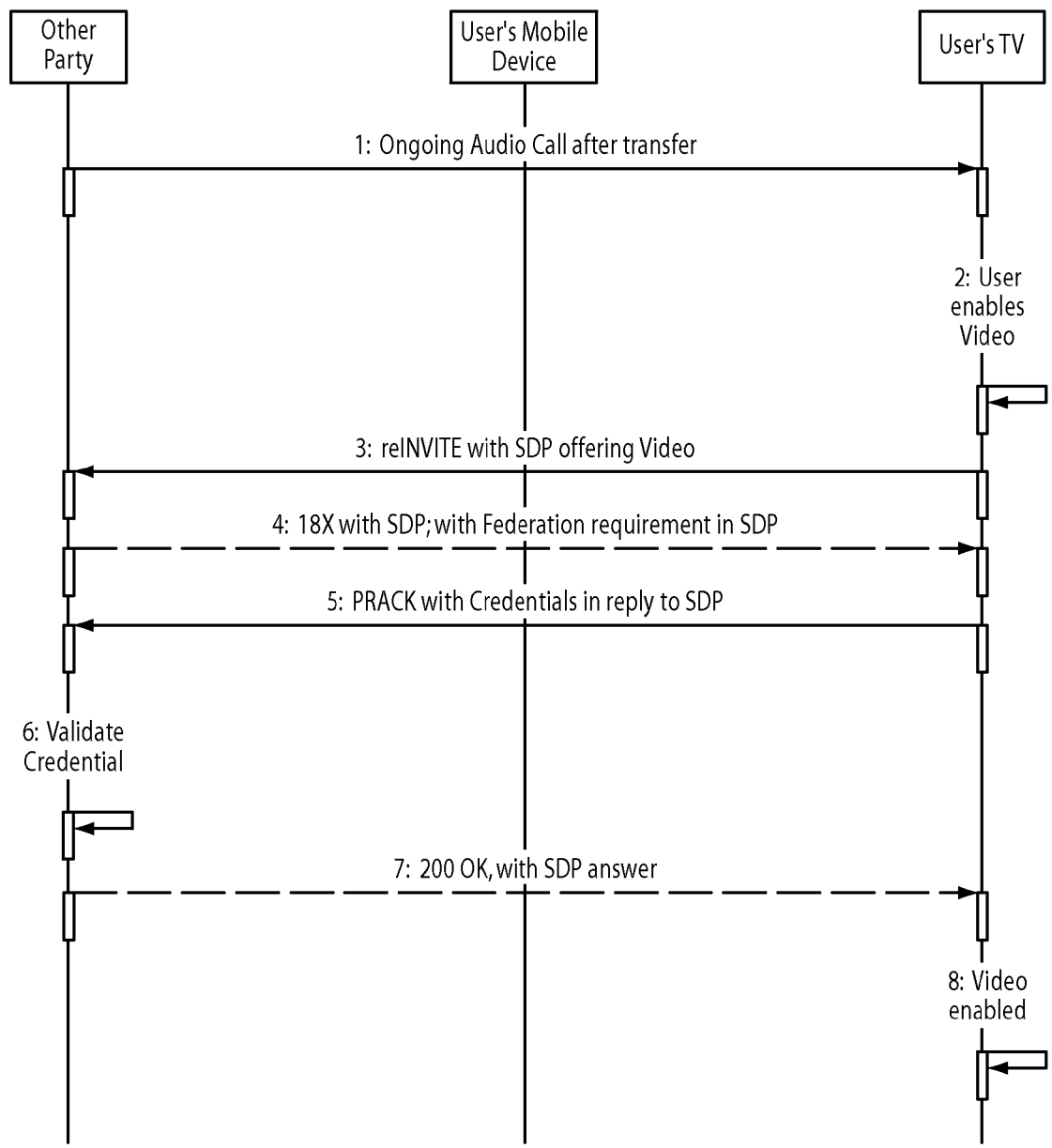
FIG. 30 comprises a call flow diagram as configured in accordance with various embodiments of the invention.

FIG. 30 presents a flow diagram 3000 that illustrates a use-case where a user is initiating a new media stream within an already existing session. For example, and referring again to the above described use-case, when the user has shifted the audio call to his large-display playback platform, the user may want to then establish a video session to accompany the existing audio session. Thus, the user seeking to transfer the session to the large-display playback platform needs to establish that they have sufficient credentials to access that playback platform as well as sufficient credentials to use video services (which may be a premium feature requiring more bandwidth). These differential identity credential requirements can be expressed on a per media session (or more specifically per media line in the SDP) basis. Herein, again, the identity federation benefits described herein can be applied for an improved user experience. When the user enables video for an ongoing call session, an appropriate SDP offer with the required video stream characteristics is sent towards the peer party. The peer participant, however, may have some identity-related requirements before it can allow the setup of the video session. Hence, it can refuse the requested video session parameters, but associate identity-federated related requirements (in the form of SAML queries) along with the rejected video streams. This rejection can be sent in a 18X provisional response to the reINVITE. The user can then verify these SAML queries and make another attempt at offering the video parameters in a PRACK to the 18X Provisional Response, this time associating them with the requisite SAML credentials. The peer participant can now verify the credentials and then send the accepted video parameters in an SDP answer in a 200 OK to the reINVITE. Finally, the video session can be enabled for the user using the identity-federation related benefits described herein.

Figure 32:
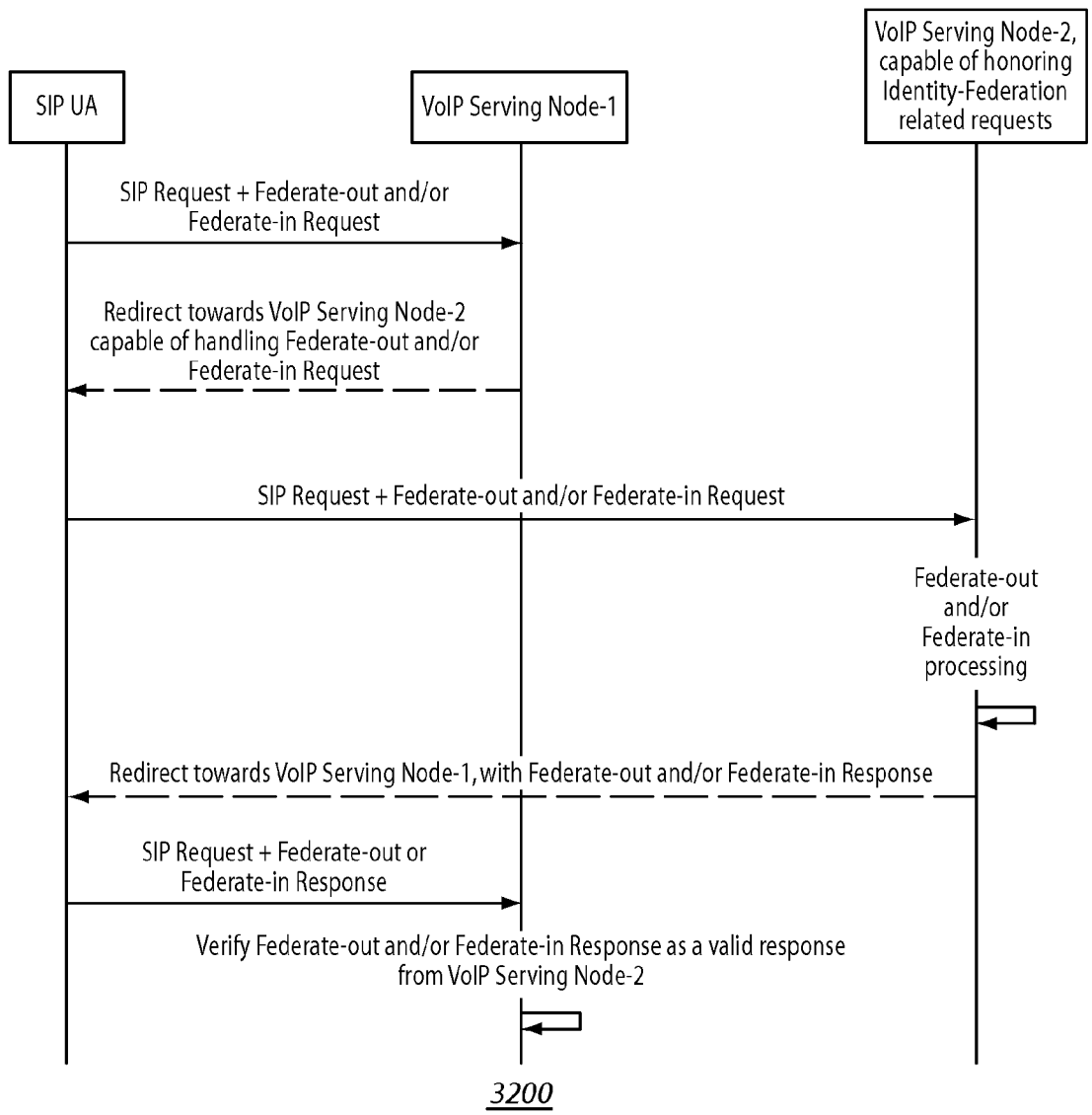
FIG. 32 comprises a call flow diagram as configured in accordance with various embodiments of the invention.

FIG. 32 presents a call flow diagram 3200 that represents an interaction between a SIP UA and a first VoIP Serving Node, wherein the SIP UA wants to use either of a Federate-out and/or a Federate-in request at the first VoIP Serving Node. In this illustrative example, the first VoIP Serving Node does not have the capabilities to honor the Federate-out and/or Federate-in request. By one approach (not shown in the illustration), the first VoIP Serving Node may return a failure response for the SIP message. By another approach (as illustrated in FIG. 32), the first VoIP Serving Node may redirect the SIP Request to a second VoIP Serving Node that is capable of honoring the Federate-out and/or Federate-in request. The SIP UA initiates the SIP request towards the second VoIP Serving node, which can process the Federate-out and/or Federate-in request. The second VoIP Serving node can then further redirect the SIP UA once again back to the first VoIP Serving node, with the Federate-out and/or Federate-in response.

The first VoIP Serving node can test the validity of the Federate-out and/or Federate-in response (for example, by validating that these responses are cryptographically signed by the public key of the second VoIP Serving node) and further process the SIP request normally. By another approach, the second VoIP Serving Node may redirect the SIP UA towards a specific uniform resource locator (URL) within the first VoIP Serving Node. The receipt of the SIP request at this specific URL would indicate to the first VoIP Serving Node of successful processing of the Federate-out and/or Federate-in request at the second VoIP Serving node. By another approach, the second VoIP Serving Node can contact the first VoIP Serving Node directly to inform the latter about the result of the processing of the Federate-out and Federate-in request. By yet another approach, the first VoIP Serving node can contact the first VoIP Serving node to query for the result of the processing of the Federate-out and/or Federate-in request.

These and numerous other examples provide but an insight into the highly leveraged functionality and capabilities that one can achieve when deploying the teachings set forth herein. These teachings will accommodate a wide range of implementation variations (involving, for example, the degree to which the processes are made transparent to a given user, or not) and are also readily scalable to accommodate essentially any application setting or requirements.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:
1. A method comprising:
  facilitating a call session for a participating entity having at least one federation-based benefit;
  using the at least one federation-based benefit to facilitate communications mobility for the participating entity during the call session, wherein facilitating communications mobility comprises moving at least a portion of the call session from a first user device to a second user device and wherein the first user device and the second user device belong to different service provider domains; and
  wherein using the at least one federation-based benefit to facilitate moving at least a portion of the call session from a first user device to a second user device during the call session further comprises, at least in part, using the at least one federation-based benefit to facilitate moving at least a first portion of the call session from the first user device to the second user device during the call session and moving at least a second portion of the call session from the first user device to a third user device during the call session, and wherein the first user device, the second user device, and the third user device are different user devices.

2. The method of claim 1 wherein facilitating a call session comprises facilitating a call session that comprises, at least in part, a wireless call session.

3. The method of claim 1 wherein the at least one federation-based benefit comprises a federation-based benefit as provided by at least one of:
   a content provider;
   a services provider.

4. The method of claim 1 wherein using the at least one federation-based benefit to facilitate communications mobility for the participating entity during the call session comprises using the at least one federation-based benefit to move at least a portion of the call session from use of a first identifier for the participating entity to a second identifier for the participating entity, wherein the second identifier is different from the first identifier.

5. The method of claim 1 wherein using the at least one federation-based benefit to facilitate communications mobility for the participating entity during the call session comprises using an application-layer control protocol configured and arranged to create, modify, and terminate communication sessions featuring at least one participant to facilitate using the at least one federation-based benefit to facilitate communications mobility for the participating entity during the call session.

6. The method of claim 5 wherein using the application-layer control protocol configured and arranged to create, modify, and terminate communication sessions featuring at least one participant to facilitate using the at least one federation-based benefit to facilitate communications mobility for the participating entity during the call session comprises directly using the application-layer control protocol configured and arranged to create, modify, and terminate communication sessions featuring at least one participant to facilitate using the at least one federation-based benefit to facilitate communications mobility for the participating entity during the call session.

7. An apparatus comprising:
   a network interface;
   a processor operably coupled to the network interface and being configured and arranged to use at least one federation-based benefit of a participating entity in a call session to facilitate communications mobility for the participating entity during the call session, wherein facilitating communications mobility comprises moving at least a portion of the call session from a first user device to a second user device and wherein the first user device and the second user device belong to different service provider domains; and
   wherein using the at least one federation-based benefit to facilitate moving at least a portion of the call session from a first user device to a second user device during the call session further comprises, at least in part, using the at least one federation-based benefit to facilitate moving at least a first portion of the call session from the first user device to the second user device during the call session and moving at least a second portion of the call session from the first user device to a third user device during the call session, and wherein the first user device, the second user device, and the third user device are different user devices.

8. The method of claim 5 wherein using an application-layer control protocol configured and arranged to create, modify, and terminate communication sessions featuring at least one participant comprises, at least in part, using at least one of:
   Session Initiation Protocol; and
   Session Description Protocol.

9. The method of claim 1 wherein:
   the federation-based benefit is based, at least in part, upon identity credentials that correspond to the participating entity; and
   using the at least one federation-based benefit to facilitate communications mobility for the participating entity during the call session comprises, at least in part, using the identity credentials.

10. The apparatus of claim 7 wherein the call session comprises, at least in part, a wireless call session.

11. The apparatus of claim 7 wherein the at least one federation-based benefit comprises a federation-based benefit as provided by at least one of:
   a content provider;
   a services provider.

12. The apparatus of claim 7 wherein the second user device is different from the first user device.

13. The apparatus of claim 7 wherein the processor is further configured and arranged to use the at least one federation-based benefit to facilitate communications mobility for the participating entity during the call session by using the at least one federation-based benefit to move at least a portion of the call session from use of a first identifier for the participating entity to a second identifier for the participating entity, wherein the second identifier is different from the first identifier.

14. The apparatus of claim 7 wherein the processor is further configured and arranged to use the at least one federation-based benefit to facilitate communications mobility for the participating entity during the call session by using an application-level control protocol to facilitate using the at least one federation-based benefit to facilitate communications mobility for the participating entity during the call session.

15. The apparatus of claim 14 wherein the processor is further configured and arranged to use an application-level control protocol to facilitate using the at least one federation-based benefit to facilitate communications mobility for the participating entity during the call session by directly using the application-level control protocol to facilitate using the at least one federation-based benefit to facilitate communications mobility for the participating entity during the call session.

16. The method of claim 1, wherein moving at least a portion of the call session from a first user device to a second user device comprises:
   conveying, by the first device to a peer participant in the call session, a session initiation protocol (SIP) message comprising credentials for the call session;
   receiving, by the second device from the peer participant, a session invitation comprising the credentials; and
   verifying, by the second device, the credentials received from the peer participant; and
   in response to verifying the credentials, setting up, by the second device, the call session with the peer participant.

17. The method of claim 16, wherein verifying comprises:
   confirming that the peer participant is engaged in the call session; and
   confirming that a user of the first device has permission to access the second device.

18. The method of claim 16, wherein the session initiation protocol (SIP) message conveyed by the first device to the peer participant is a SIP REFER message and wherein the session invitation received by the second device from the peer participant is a SIP INVITE.

* * * * *